US012181158B2

(12) United States Patent
Crowe

(10) Patent No.: US 12,181,158 B2
(45) Date of Patent: *Dec. 31, 2024

(54) MODULAR ASSEMBLY FOR ELECTRIC FIREPLACE

(71) Applicant: Greentouch USA, Inc., Miami Beach, FL (US)

(72) Inventor: Matthew Alfred Crowe, Dongguan (CN)

(73) Assignee: Greentouch USA, Inc., Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,640

(22) Filed: Mar. 13, 2023

(65) Prior Publication Data

US 2023/0213202 A1 Jul. 6, 2023

Related U.S. Application Data

(63) Continuation of application No. 17/581,100, filed on Jan. 21, 2022, now Pat. No. 11,619,391, which is a (Continued)

(51) Int. Cl.

| | |
|---|---|
| ***F24C 7/00*** | (2006.01) |
| ***F21S 10/04*** | (2006.01) |

(Continued)

(52) U.S. Cl.

CPC .............. *F24C 7/004* (2013.01); *F21S 10/04* (2013.01); *F24C 15/06* (2013.01); *H05B 1/0277* (2013.01); *F21W 2121/00* (2013.01)

(58) Field of Classification Search

CPC . F24C 3/006; F24C 7/004; F21S 10/04; F21S 10/043; F21S 10/046;

(Continued)

(56) References Cited

U.S. PATENT DOCUMENTS 1,889,103 A * 11/1932 Naftal ..................... F24B 1/191 312/107
2,474,594 A 6/1949 Rausch et al.

(Continued)

FOREIGN PATENT DOCUMENTS

CN 108036389 A 5/2018
CN 110657484 A 1/2020

(Continued)

OTHER PUBLICATIONS

International Search Report and Written Opinion issued in PCT Application Serial No. PCT/US22/30902, by the European Patent Office on Oct. 25, 2022. (Related matter) *All NPLs are Available in the Parent, U.S. Appl. No. 17/581,100*.

(Continued)

*Primary Examiner* — David R Dunn
*Assistant Examiner* — Christopher E Veraa
(74) *Attorney, Agent, or Firm* — ROEDER & BRODER LLP; Steven G. Roeder

(57) ABSTRACT

An electric fireplace (10) includes a fireplace housing (12) and an electrical insert (40). The fireplace housing (12) includes a base panel (30) having a base opening (230A), a back panel (32), and at least one side panel (34). The electrical insert (40) is sized and shaped to fit and be supported and retained within the base opening (230A). Additionally, the electrical insert (40) can include a heater (26), and a controller (28) including a processor that is configured to control operation of the electric fireplace (10). Further, each of the base panel (30), the back panel (32) and the at least one side panel (34) can be manufactured and installed independently of one another. The fireplace housing (12) can further include a front frame (236) that is manufactured and installed independently of each of the base panel (30), the back panel (32) and the at least one side (Continued)

panel (34). Still further, at least one of the back panel (32) and the at least one side panel (34) can be foldable.

20 Claims, 15 Drawing Sheets

Related U.S. Application Data continuation of application No. 16/714,310, filed on Dec. 13, 2019, now Pat. No. 11,619,390.

(60) Provisional application No. 62/905,077, filed on Sep. 24, 2019.

(51) Int. Cl.
*F21W 121/00* (2006.01)
*F24C 15/06* (2006.01)
*H05B 1/02* (2006.01)

(58) Field of Classification Search
CPC .... F24D 19/1096; F24B 1/1808; F24B 1/185; F21W 2131/307; H05B 3/008
See application file for complete search history.

(56) References Cited

U.S. PATENT DOCUMENTS 2,486,517 A 11/1949 Casali
3,216,774 A 11/1965 Leonard
3,742,189 A * 6/1973 Conroy .................. F24C 7/004 D23/343
4,272,908 A 6/1981 Bassetti et al.
4,932,224 A 6/1990 Katterhenry
5,839,427 A 11/1998 Shorts
6,006,742 A 12/1999 Jamieson et al.
6,162,047 A 12/2000 Hess
7,300,179 B1 11/2007 LaDuke et al.
D616,977 S 6/2010 Asofsky et al.
7,826,727 B2 11/2010 Bourne
D654,995 S 2/2012 Asofsky et al.
D654,996 S 2/2012 Asofsky et al.
D658,749 S 5/2012 Crowe et al.
D658,750 S 5/2012 Nemes
D666,281 S 8/2012 Nemes
D668,748 S 10/2012 Asofsky et al.
8,286,352 B1 * 10/2012 Ray .................... E04H 17/1602 52/270
D687,136 S 7/2013 Nemes
D687,137 S 7/2013 Nemes
D687,937 S 8/2013 Nemes
D694,380 S 11/2013 Crowe et al.
D694,873 S 12/2013 Nemes et al.
8,739,439 B2 6/2014 Asofsky et al.
D738,477 S 9/2015 Nemes et al.
9,310,097 B2 4/2016 Harley et al.
9,395,100 B2 7/2016 Crowe et al.
9,459,010 B2 10/2016 Asofsky et al.
9,476,596 B2 10/2016 Asofsky et al.
10,247,375 B1 * 4/2019 Lu ........................ F21S 10/043
10,274,188 B2 4/2019 Sculler
10,473,335 B2 11/2019 Nemes et al.
10,845,090 B2 11/2020 Crowe
10,883,722 B2 1/2021 Crowe
11,026,458 B2 6/2021 Crowe
D931,430 S 9/2021 Schafer et al.
D931,431 S 9/2021 Schafer et al.
11,659,928 B2 5/2023 Miller
2002/0152655 A1 10/2002 Merrill et al.
2002/0166554 A1 11/2002 Berg
2003/0126775 A1 7/2003 Corry et al.
2004/0173202 A1 9/2004 Lyons et al.
2004/0264949 A1 12/2004 Deng
2006/0191529 A1 * 8/2006 McDonald ............. F24B 1/198 52/36.3
2006/0230656 A1 10/2006 Spengler
2006/0242870 A1 11/2006 Atemboski
2007/0107280 A1 5/2007 Stinson et al.
2007/0221204 A1 9/2007 Hussong et al.
2007/0221206 A1 9/2007 Phillips et al.
2008/0013931 A1 1/2008 Bourne
2008/0083404 A1 4/2008 Rappold
2008/0143219 A1 6/2008 Free
2008/0164787 A1 7/2008 Peng
2008/0181587 A1 7/2008 Patil
2008/0181588 A1 7/2008 Gorby
2008/0216818 A1 9/2008 Rumens et al.
2009/0038606 A1 2/2009 Weinberger
2009/0126241 A1 5/2009 Asofsky
2009/0205263 A1 * 8/2009 Heath .................... F24B 1/198 52/36.3
2009/0205633 A1 8/2009 Hussong
2009/0220221 A1 9/2009 Zhou
2010/0043775 A1 2/2010 Phillips et al.
2010/0229849 A1 9/2010 Asofsky et al.
2010/0326421 A1 12/2010 Atemboski
2011/0080261 A1 4/2011 Asofsky et al.
2011/0286725 A1 11/2011 O'Toole
2012/0048841 A1 3/2012 Asofsky et al.
2012/0155075 A1 6/2012 Asofsky et al.
2013/0309507 A1 * 11/2013 Lau ...................... B32B 21/042 428/425.1
2013/0328686 A1 12/2013 Nemes
2013/0330485 A1 12/2013 Crowe
2014/0044423 A1 * 2/2014 Chu ......................... F24H 9/02 392/363
2014/0161425 A1 6/2014 Harley
2014/0161426 A1 6/2014 Crowe et al.
2014/0305013 A1 10/2014 Peterson
2014/0326794 A1 11/2014 Frank
2015/0131275 A1 5/2015 Robl
2015/0139629 A1 5/2015 Crowe et al.
2015/0267922 A1 * 9/2015 Lu ......................... A47B 46/00 219/218
2017/0051920 A1 2/2017 Lenz
2017/0089587 A1 3/2017 Nemes et al.
2017/0122550 A1 5/2017 Sculler
2017/0211814 A1 * 7/2017 Bourne .................. F24C 15/06
2017/0261212 A1 9/2017 Tao
2017/0328575 A1 11/2017 Crowe
2017/0363320 A1 12/2017 Crowe
2018/0135309 A1 * 5/2018 Mann ................. E04F 13/0873
2018/0149323 A1 5/2018 Goetz
2018/0299086 A1 10/2018 Gallo et al.
2018/0347818 A1 12/2018 Birnbaum
2018/0347820 A1 * 12/2018 Bourne .................. F24C 7/004
2020/0072470 A1 3/2020 Nemes et al.
2021/0372627 A1 12/2021 Walker
2022/0299209 A1 9/2022 Jones

FOREIGN PATENT DOCUMENTS

GB 2265555 A 9/1993
GB 2321961 A 8/1998
GB 2408569 A 6/2005

OTHER PUBLICATIONS

Office Action issued by the U.S. Patent Office in U.S. Appl. No. 16/714,310 on Jun. 29, 2022. (Related matter) *All NPLs are Available in the Parent, U.S. Appl. No. 17/581,100*.
Provisional Opinion Accompanying The Partial Search Result issued by the International Searching Authority, EPO, dated Jan. 26, 2021, for PCT Application Serial No. PCT/US2020/052486. (related matter) *All NPLs are Available in the Parent, U.S. Appl. No. 17/581,100*.
International Search Report and Written Opinion issued by the International Searching Authority, EPO, dated May 10, 2021, for

(56) References Cited

OTHER PUBLICATIONS

PCT Application Serial No. PCT/US2020/052486. (related matter)
*All NPLs are Available in the Parent, U.S. Appl. No. 17/581,100*.

* cited by examiner

MODULAR ASSEMBLY FOR ELECTRIC FIREPLACE

RELATED APPLICATIONS

This application is a Continuation Application and claims the benefit under 35 U.S.C. 120 on co-pending U.S. patent application Ser. No. 17/581,100, filed Jan. 21, 2022, and entitled "MODULAR ASSEMBLY FOR ELECTRIC FIREPLACE". Additionally, U.S. patent application Ser. No. 17/581,100 is a Continuation Application and claims the benefit under 35 U.S.C. 120 on co-pending U.S. patent application Ser. No. 16/714,310, filed on Dec. 13, 2019, entitled "MODULAR ASSEMBLY FOR ELECTRIC FIREPLACE". Additionally, U.S. patent application Ser. No. 16/714,310 claims priority on U.S. Provisional Patent Application Ser. No. 62/905,077, entitled "MODULAR ASSEMBLY FOR ELECTRIC FIREPLACE", filed on Sep. 24, 2019. As far as permitted, the contents of U.S. patent application Ser. No. 16/714,310, U.S. patent application Ser. No. 17/581,100 and U.S. Provisional Patent Application Ser. No. 62/905,077 are incorporated in their entirety herein by reference.

BACKGROUND

Fireplaces of various types can be installed in homes and commercial establishments as a means to provide a source of heat and for aesthetic reasons. Although traditionally such fireplaces have most often taken the form of wood-burning fireplaces and gas-burning fireplaces, electric fireplaces have become increasingly popular in recent years. An electric fireplace is typically designed to look like a traditional wood-burning fireplace, but does not actually burn wood. As such, there is a continuing desire to make electric fireplaces look more realistic, i.e. to make electric fireplaces look more like a traditional wood-burning fireplace.

Unfortunately, in most currently available electric fireplaces, an electrical insert portion, which commonly contains a heater, a flame generator, simulated logs and a glass frame, typically comes completely assembled and wired, and thus takes up a lot of space for packaging, shipping and storing. Additionally, such currently available electric fireplaces also do not generally allow for substantial variability in terms of the overall size, shape and aesthetic appearance of the electric fireplace. Thus, there is also a desire to allow greater variety in the size, shape and aesthetic appearance of the electric fireplace, while still enabling various product development, packaging, shipping, storing and overall cost efficiencies.

SUMMARY

The present invention is directed toward an electric fireplace including a fireplace housing and an electrical insert. In various embodiments, the fireplace housing includes (i) a base panel having a base opening, (ii) a back panel, and (iii) at least one side panel. The electrical insert is sized and shaped to fit and be supported and retained within the base opening.

In some embodiments, the electrical insert includes a heater, and at least a portion of a controller including a processor that is configured to control operation of the electric fireplace. Further, in certain embodiments, the electrical insert is fully embedded into the base opening such that no portion of the electrical insert extends above a top surface of the base panel.

Additionally, in certain embodiments, at least one of the back panel and the at least one side panel is foldable. Moreover, in some such embodiments, each of the back panel and the at least one side panel is foldable.

Further, in some embodiments, the electric fireplace also includes one or more simulated logs and a grate that is configured to support the one or more simulated logs. In such embodiments, the one or more simulated logs and the grate are configured to be positioned substantially within the fireplace housing during use of the electric fireplace. Further, in certain such embodiments, the electric fireplace further includes a flame generator that is coupled to the grate, the flame generator being configured to selectively generate a simulated flame within the fireplace housing.

In certain embodiments, each of the base panel, the back panel and the at least one side panel are manufactured and installed independently of one another. Additionally, in some embodiments, the fireplace housing further includes a front frame that is manufactured and installed independently of each of the base panel, the back panel and the at least one side panel.

The present invention is further directed toward an electric fireplace including a fireplace housing including a base panel, a back panel, and at least one side panel, each of the base panel, the back panel and the at least one side panel being manufactured and installed independently of one another; and wherein at least one of the back panel and the at least one side panel is foldable.

Additionally, the present invention is further directed toward a method for manufacturing an electric fireplace. In one embodiment, the method includes providing a fireplace housing including (i) a base panel having a base opening, (ii) a back panel, and (iii) at least one side panel; and embedding an electrical insert within the base opening, the electrical insert including a heater, and a controller including a processor that is configured to control operation of the electric fireplace.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a modular assembly for an electric fireplace. More particularly, the modular assembly and design for the electric fireplace enables greater flexibility to the consumer for the overall design of the electric fireplace, as well as offering various cost and product development efficiencies. For example, numerous options for different components of the electric fireplace can be incorporated together in any desired manner to provide various alternatives for the overall size, shape and design of the electric fireplace. Additionally, in various embodiments, the components of the electric fireplace can be configured relative to one another so that they can be packaged together much more compactly, which can provide even further cost efficiencies.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
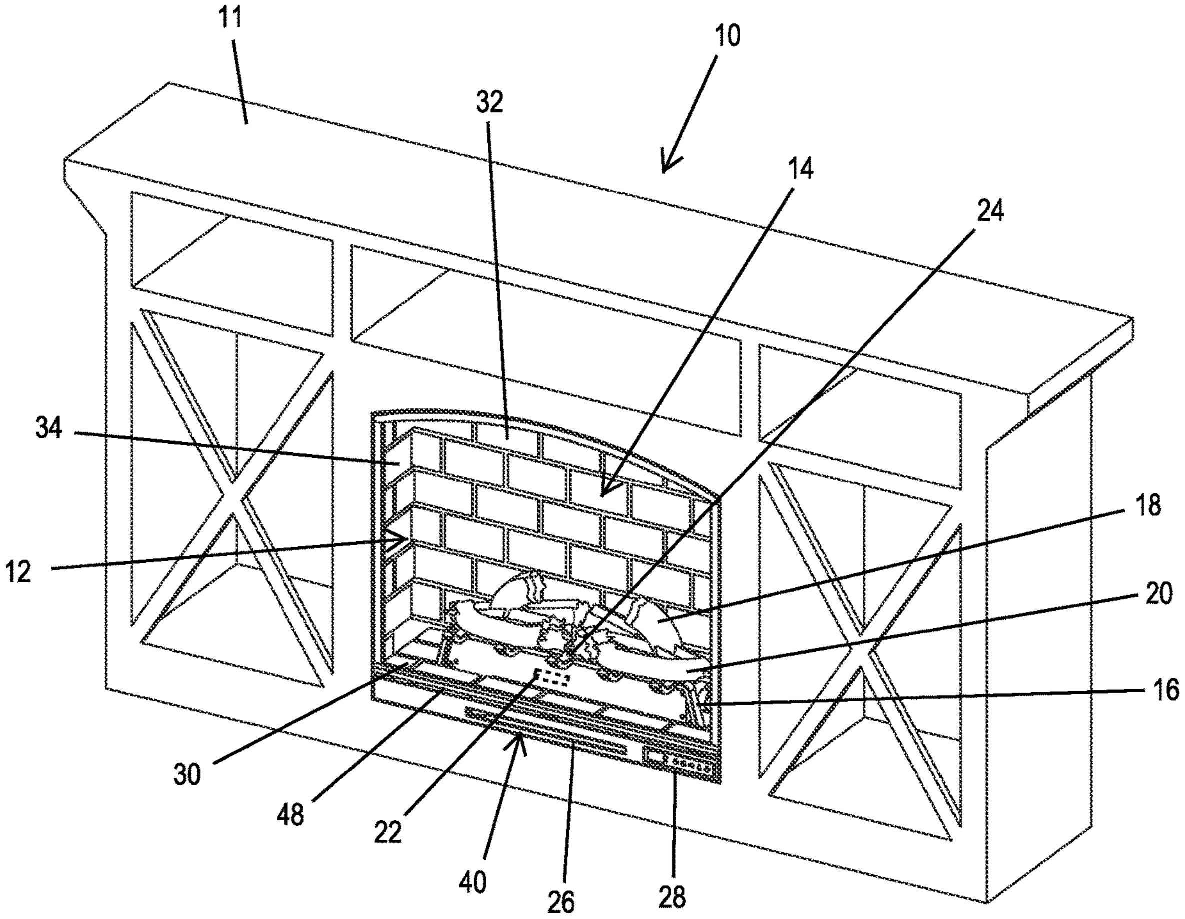
FIG. 1 is a front perspective view illustration of an embodiment of an electric fireplace having features of the present invention.

FIG. 1 is a front perspective view illustration of an embodiment of an electric fireplace 10 having features of the present invention. Additionally, as shown, the electric fireplace 10 is positioned and/or integrated into a cabinet 11 having a structural opening 211A (illustrated more clearly in FIG. 2) that is configured to receive the electric fireplace 10. It is appreciated that the cabinet 11 and/or the structural opening 211A can be of any suitable size, shape and design, which can be different than what is specifically shown in FIG. 1. Thus, the specific size, shape and design of the cabinet 11 and/or the structural opening 211A illustrated in the Figures is not intended to be limiting in any manner.

As illustrated herein, the electric fireplace 10 can be used to provide heat and to simulate a wood burning fire, e.g., in a room of a home or other type of building. More particularly, in certain embodiments, the electric fireplace 10 can be configured to look like a traditional wood-burning fireplace, although the electric fireplace 10 does not actually burn wood.

The design of the electric fireplace 10 can be varied. In certain embodiments, as illustrated in FIG. 1, the electric fireplace 10 can include (i) a fireplace housing 12; (ii) a viewing area 14 that is defined within the fireplace housing 12; (iii) a grate 16; (iv) a simulated flame 18 (i.e. which is visible when the electric fireplace 10 is in use); (v) one or more simulated logs 20; (vi) a light source 22 (illustrated as a box in phantom) and/or a flame generator 24 that can be used to selectively generate the simulated flame 18 and/or to create a glowing effect for the simulated logs 20; (vii) a heater 26; and (viii) a controller 28. Alternatively, the electric fireplace 10 can include more components or fewer components than those specifically illustrated in FIG. 1. For example, in one non-exclusive alternative embodiment, the electric fireplace 10 can further include a simulated emberbed, and/or can be configured without the heater 26. Still alternatively, the various components of the electric fireplace 10 can be positioned in a different manner than that shown in FIG. 1.

As utilized herein, the cabinet 11 is also sometimes referred to generally as a "mantel", and the additional components of the electric fireplace 10 that are selectively positioned within the fireplace housing 12, e.g., during use and/or packaging of the electric fireplace 10, are also sometimes referred to generally as an "insert".

As an overview, in certain embodiments, the electric fireplace 10 is uniquely formed with a modular design such that various components are manufactured and installed independently of one another. Stated in another manner, the electric fireplace 10 can be constructed via a knock/down ("K/D") method, and one or more of the components can be K/D components that can be individually installed by the user or consumer. With such design, the electric fireplace 10 can be constructed by the consumer, i.e. at the consumer level, from the component parts, and need not be constructed at the manufacturer/factory level as is done with typical electric fireplaces. Additionally, with such design, the electric fireplace 10 can be configured to have any suitable size, shape and design depending on the preferences of the consumer. For example, as described herein, the fireplace housing 12 can be formed from multiple individual components (e.g., a base panel 30, a back panel 32, side panels 34 and a front frame 236 (illustrated more clearly in FIG. 2)) of varying designs, sizes and shapes, which can be configured together to fit within structural openings of different sizes and shapes. Additionally, the design of each of the components of the electric fireplace 10 can be mixed and matched as desired. Thus, with the modular design described herein, the consumer is provided with a larger variety of options for the overall design (e.g., size, shape and aesthetic appearance) of the electric fireplace 10, thus enhancing consumer control and happiness, while still enabling various cost and product development efficiencies.

Further, in certain embodiments, some components of the electric fireplace 10, e.g., individual components of the fireplace housing 12 such as the back panel 32 and/or the side panels 34, may be configured to be flexible and/or foldable so as to take up less space when not in use, e.g., during packaging, shipping and/or storage. Still further, as provided herein, various components can be configured to fit together compactly when installed and in use, and/or during packaging, shipping and/or storing of the electric fireplace 10. For example, in some embodiments, as described in greater detail herein below, the heater 26 and the controller 28 can be packaged together into an integrated electrical insert 40, which can be sized and shaped to fit and/or be embedded within a base opening 230A (illustrated in FIG. 2) of the base panel 30 so that the size of the combined base panel 30 and electrical insert 40 is not much larger than the size of the base panel 30 by itself. As utilized herein, the combined base panel 30 and electrical insert 40 are also sometimes referred to as a "base module".

Thus, with such design, all of the components of the electric fireplace 10 can be provided in a much smaller overall package, e.g., similar to the size of just the fireplace housing 12, which can provide various cost efficiencies for shipping, storing, etc. Stated in another manner, the packaging size of the full electric fireplace 10, i.e. the mantel plus the insert, is roughly the same size as the packaging size for only a typical mantel. Moreover, with the product design as described in detail herein, the various components of the fireplace housing 12, and the electric fireplace 10 in general, can be manufactured independently of one another, and then such components, e.g., the base panel 30, the back panel 32, the side panels 34, the electrical insert 40, the grate 16, the simulated logs 20, etc., can be installed independently of one another at the consumer level.

Upon installation of the electric fireplace 10, the fireplace housing 12 can be sized and shaped to retain most, if not all, of the remaining components of the electric fireplace 10. In particular, in many embodiments, the grate 16, the simulated flame 18 (i.e. when the electric fireplace 10 is in use), the one or more simulated logs 20, the light source 22, the flame generator 24, the heater 26 and the controller 28 can be positioned substantially within the fireplace housing 12 once the electric fireplace 10 has been installed and prepared for use. In some embodiments, as shown in FIG. 1, the fireplace housing 12 can be installed and configured to have a substantially rectangular shape. Alternatively, the fireplace housing 12 can be installed and configured to have a different shape depending on the preferences of the consumer and the limitations of the structural opening 211A within which the electric fireplace 10 is being installed.

Further, the fireplace housing 12, and the various individual components thereof, can be formed from any suitable materials. For example, in some embodiments, the fireplace housing 12, and the various individual components thereof, can be formed from any of a number of suitable metallic materials. Alternatively, the fireplace housing 12, and the various individual components thereof, can be formed from any other suitable materials.

The viewing area 14 is the area within the fireplace housing 12 in which the grate 16, the simulated flame 18, the simulated logs 20, and the simulated emberbed (when included) are displayed and can be seen by the user.

As illustrated, the grate 16, i.e. an actual or simulated grate, is configured to support the simulated logs 20 above the base panel 30 of the fireplace housing 12. Additionally, the grate 16 can be positioned substantially directly above the base module, i.e. the base panel 30 and/or the electrical insert 40.

Further, the grate 16 can also be formed from any suitable materials. For example, in certain non-exclusive alternative embodiments, the grate 16 can be formed from metallic materials such as a welded steel or aluminum material. Alternatively, the grate 16 can be formed from plastic, resin, and/or another suitable material.

As shown in FIG. 1, in various embodiments, the simulated flame 18 is displayed within the viewing area 14 of the electric fireplace 10. The simulated flame 18 is configured to give the electric fireplace 10 a more realistic appearance, i.e. to make the electric fireplace 10 look more like a traditional wood-burning fireplace. The simulated flame 18 can be formed from any suitable method. For example, in various embodiments, the electric fireplace 10 can utilize the light source 22 to illuminate a reflective medium, e.g., a suitable metal material, to generate the simulated flame 18, i.e. a flickering flame image. Alternatively, the simulated flame 18 can be generated through specific use of the flame generator 24 that is specifically configured to generate the simulated flame 18. Still alternatively, the simulated flame 18 can be generated in another suitable manner.

As noted above, upon installation, the simulated (or artificial) logs 20 can be retained within the fireplace housing 12 and thus positioned within the viewing area 14. Additionally, in certain embodiments, the simulated logs 20 can utilize the light source 22, the flame generator 24 and/or a separate light source to create a glowing effect for the simulated logs 20. Thus, the combination of the simulated logs 20 and the simulated flame 18 can use the light source 22, the flame generator 24 and/or a separate light source to create the appearance of burning logs, thereby closely simulating the flames of a wood-burning fireplace. As illustrated, the simulated logs 20 can further be placed on top of the grate 16. Alternatively, in one embodiment, the simulated logs 20 can be integrally formed with the grate 16.

Additionally, the simulated logs 20 can be formed from any suitable materials. For example, in certain non-exclusive alternative embodiments, the simulated logs 20 can be hollow molded logs that are formed from a molded resin material. Alternatively, the simulated logs 20 can be formed from another suitable material.

In some embodiments, when included as part of the electric fireplace 10, the simulated emberbed can be positioned adjacent to the base panel 30 of the fireplace housing 12 and substantially directly below the grate 16. Additionally, the simulated emberbed can also utilize the light source 22, the flame generator 24 and/or a separate light source to create a glowing effect for the simulated emberbed. It is appreciated that the glowing effect for the simulated emberbed can further enhance the overall look of the electric fireplace 10 to be more like that of a traditional wood-burning fireplace.

Further, the simulated emberbed can be formed from any suitable materials. For example, in certain non-exclusive alternative embodiments, the simulated emberbed can be formed from a molded resin material. Alternatively, the simulated emberbed can be formed from another suitable material.

As noted above, the light source 22 can be configured to assist in the generation of the simulated flame 18, as well as helping to create the glowing effect for the simulated logs 20 and/or the simulated emberbed. Stated in another manner, the light source 22 can be utilized, i.e. selectively activated, for purposes of generating the simulated flame 18, creating a glowing effect for the simulated logs 20, and/or creating a glowing effect for the simulated emberbed.

The light source 22 can have any suitable design. For example, in one non-exclusive alternative embodiment, the light source 22 can include a flat, PCB board upon which is mounted an LED panel having one or more LED light bulbs. It is appreciated that the use of LED light bulbs makes it generally unnecessary to access the light source 22 as the LED light bulbs have a very long life span and do not need to be regularly replaced. Alternatively, the light source 22 can have another suitable design, e.g., can include other types of light bulbs or another type of light source. Additionally, the light source 22 can be positioned in any suitable manner for purposes of more effectively generating the simulated flame 18, creating a glowing effect for the simulated logs 20, and/or creating a glowing effect for the simulated emberbed, as desired.

In some embodiments, the light source 22 can be incorporated and/or formed into the structure of the grate 16. Thus, with the light source 22 incorporated into the grate 16, additional size and space efficiencies can be achieved. Alternatively, the light source 22 can be provided independently of the grate 16.

Similarly, as noted above, the flame generator 24 can also or alternatively be configured to assist in the generation of the simulated flame 18, as well as helping to create the glowing effect for the simulated logs 20 and/or the simulated emberbed. Stated in another manner, the flame generator 24 can be utilized, i.e. selectively activated, in conjunction with the light source 22 or in lieu of the light source 22, for purposes of generating the simulated flame 18, creating a glowing effect for the simulated logs 20, and/or creating a glowing effect for the simulated emberbed.

In some embodiments, the flame generator 24 can be incorporated and/or formed into the structure of the grate 16. Thus, with the flame generator 24 incorporated into the grate 16, additional size and space efficiencies can be achieved. Alternatively, the flame generator 24 can be provided independently of the grate 16.

Further, in certain embodiments, the grate 16 and the light source 22 and/or the flame generator 24, as well as the simulated logs 20, can be independent components that can be installed within the structural opening 211A by the user. Still further, in some embodiments, the grate 16 with the light source 22 and/or the flame generator 24, as well as the simulated logs 20, can be provided together and can be positioned on top of the base module, i.e. the base panel 30 and/or the electrical insert 40, during packaging and/or during use of the electric fireplace 10.

Figure 2:
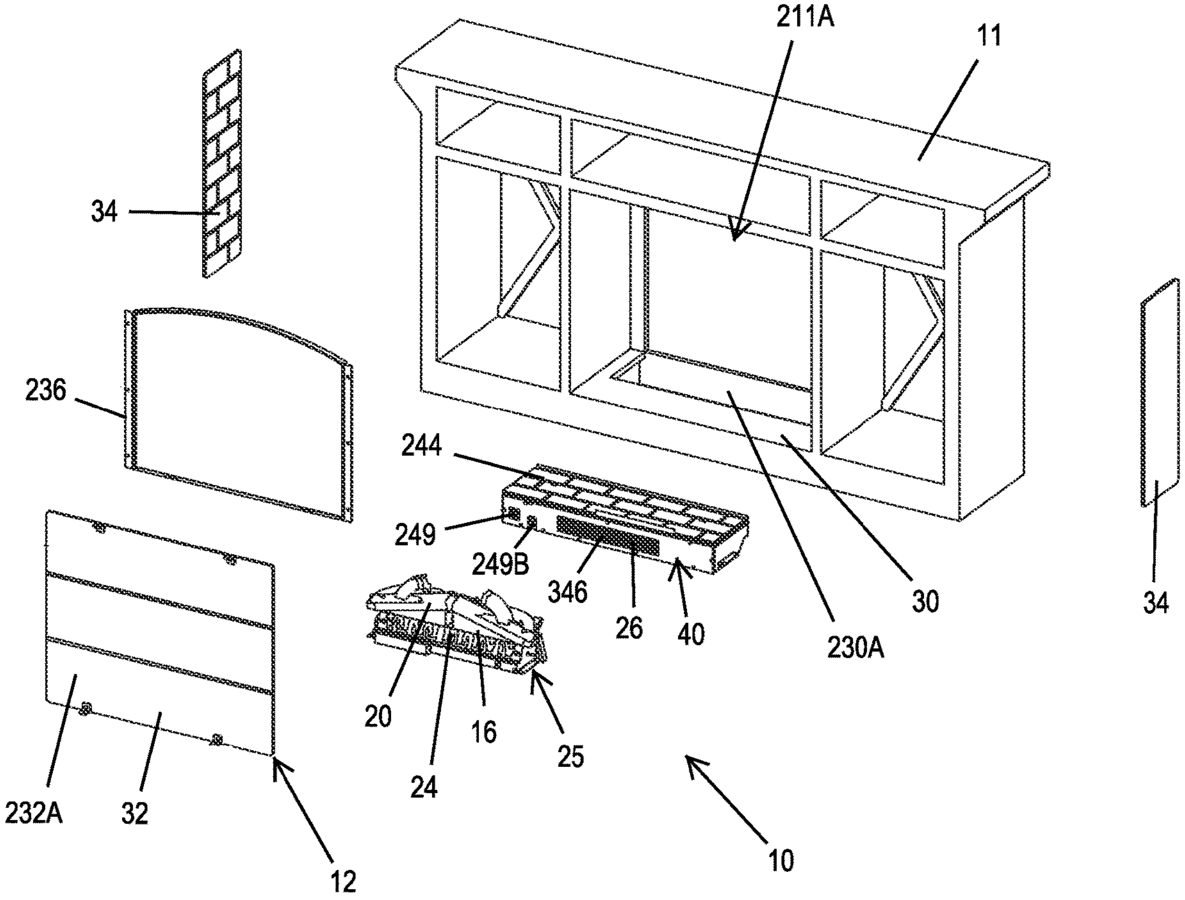
FIG. 2 is a partially exploded rear perspective view illustration of the electric fireplace illustrated in FIG. 1.
Figure 3A:
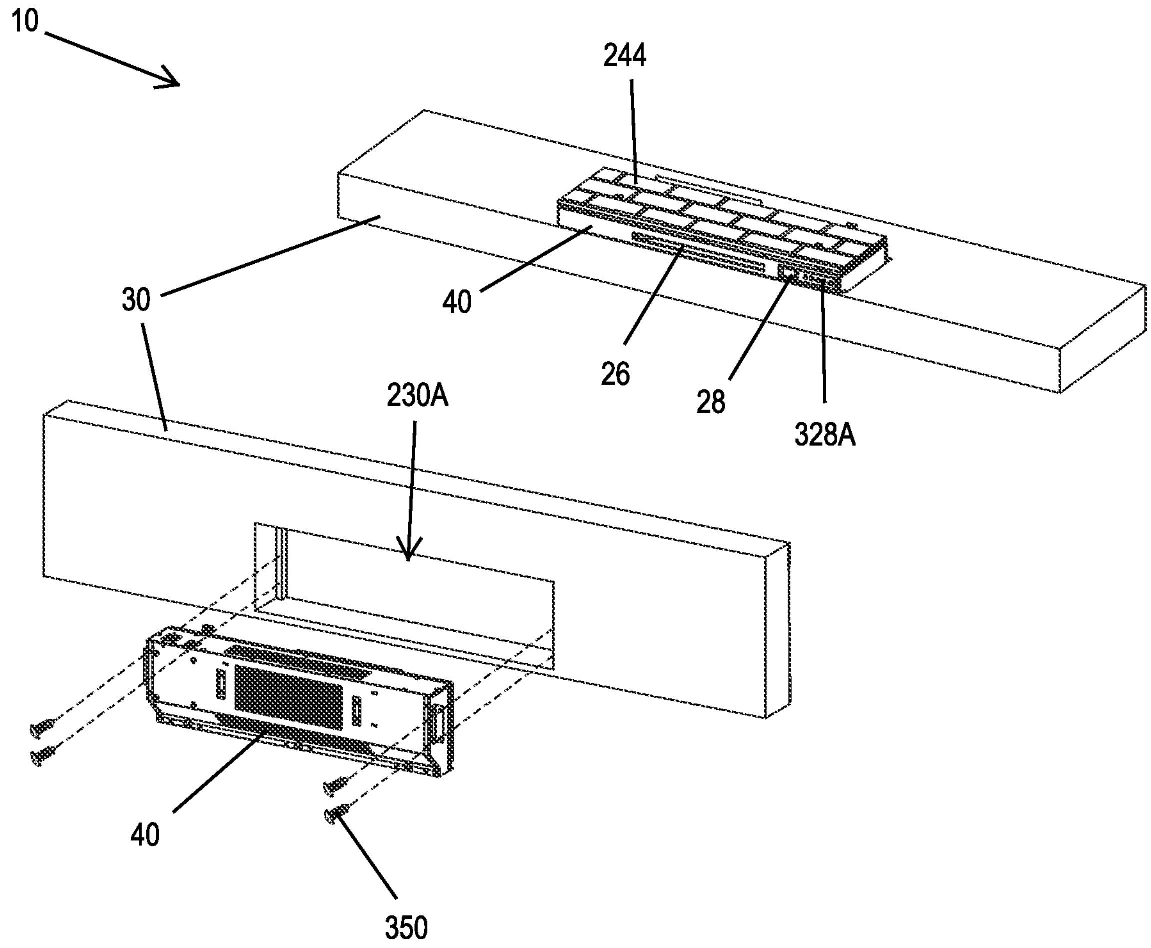
FIGS. 3A-3K are a set of illustrations showing one representative embodiment of a method of installation of the electric fireplace.
Figure 3B:
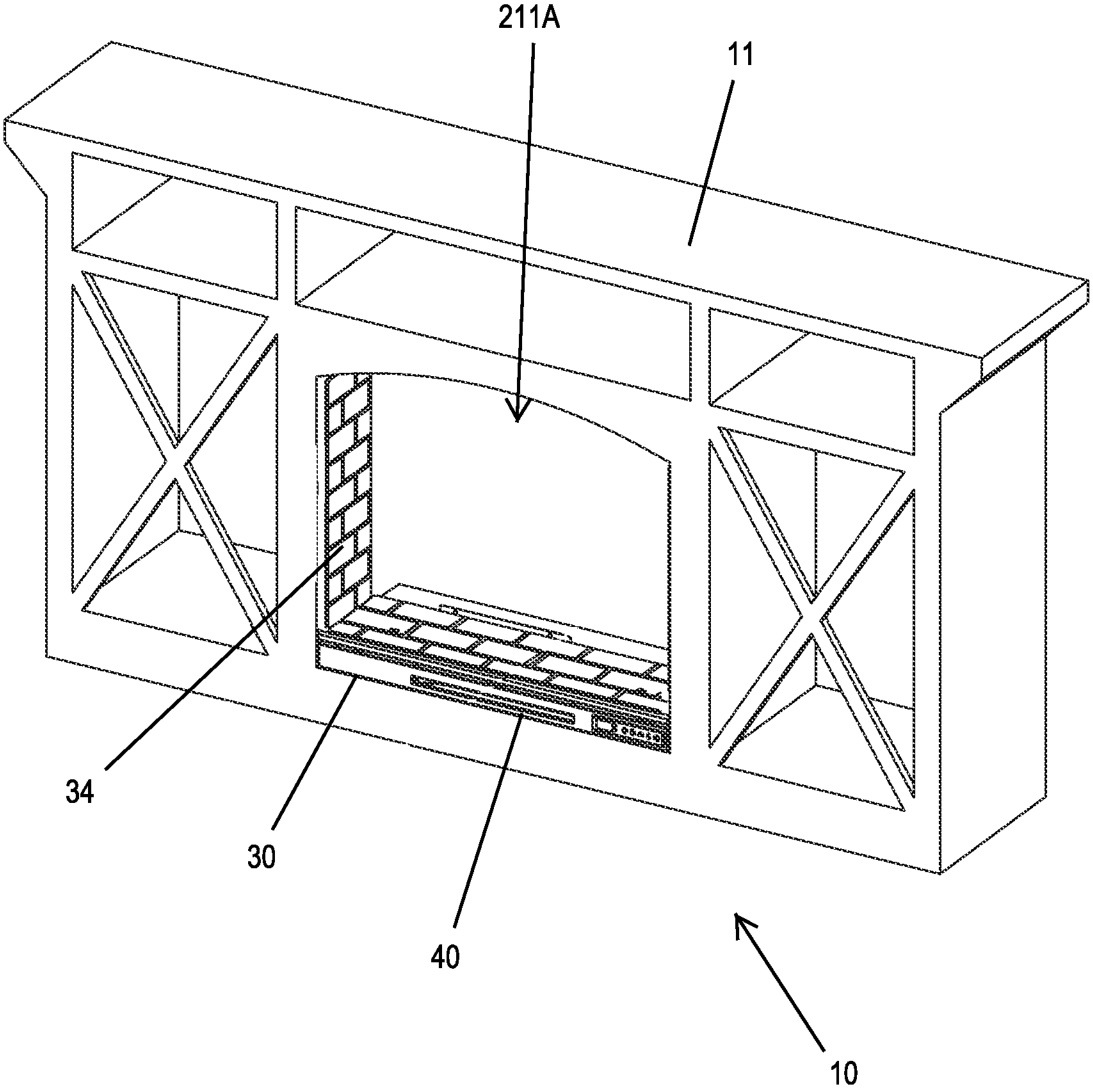
Figure 3C:
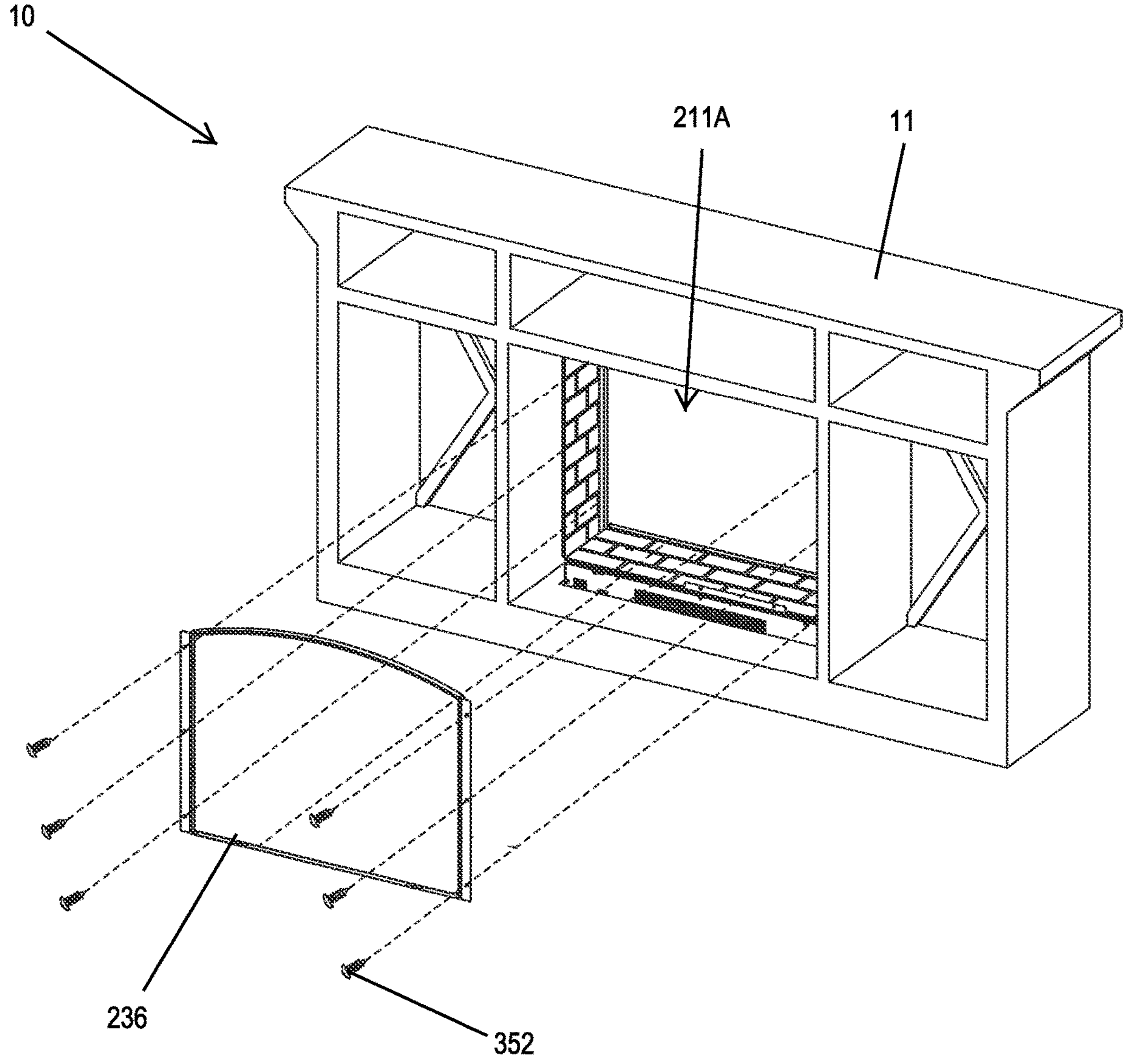
Figure 3D:
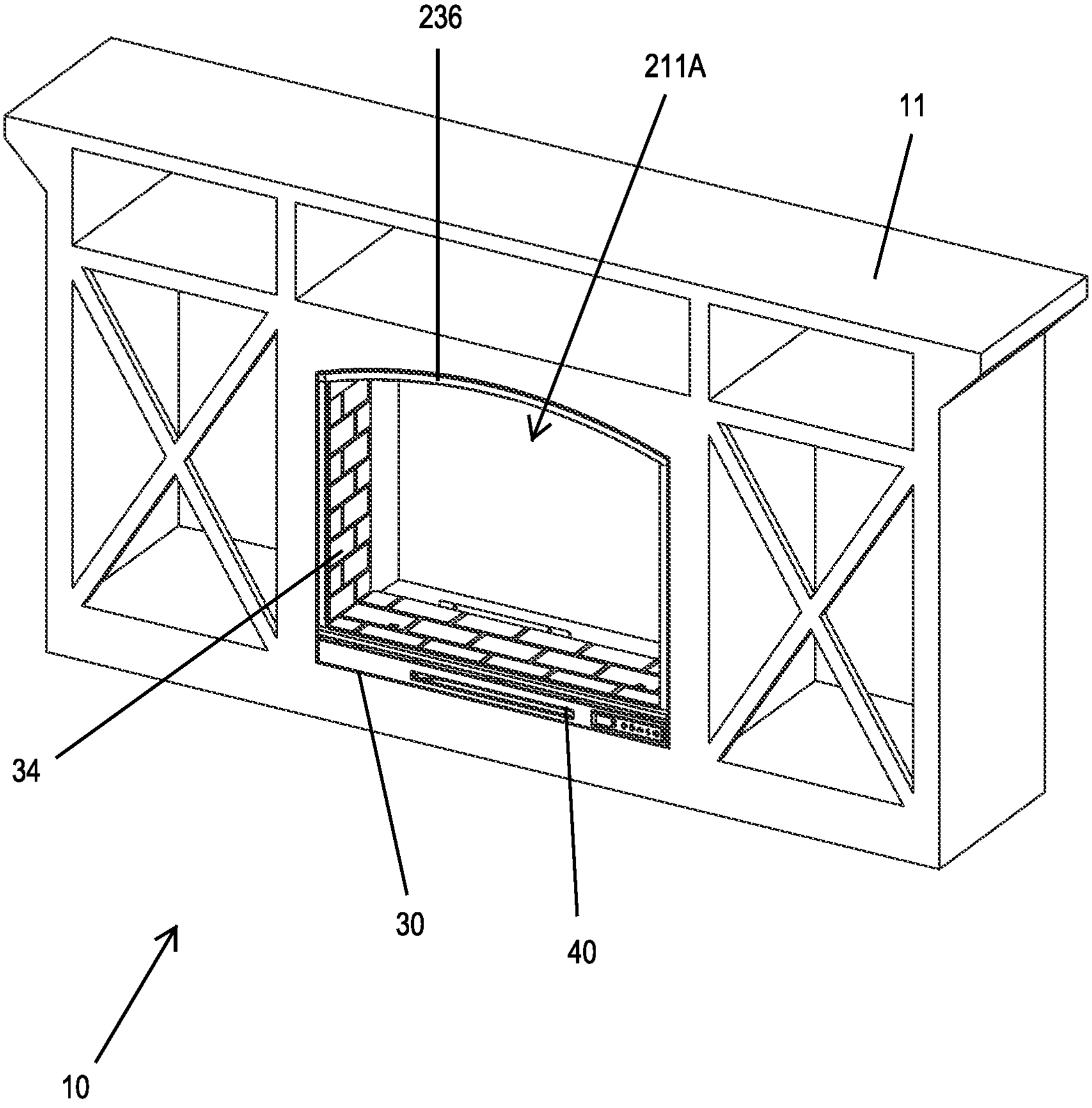
Figure 3E:
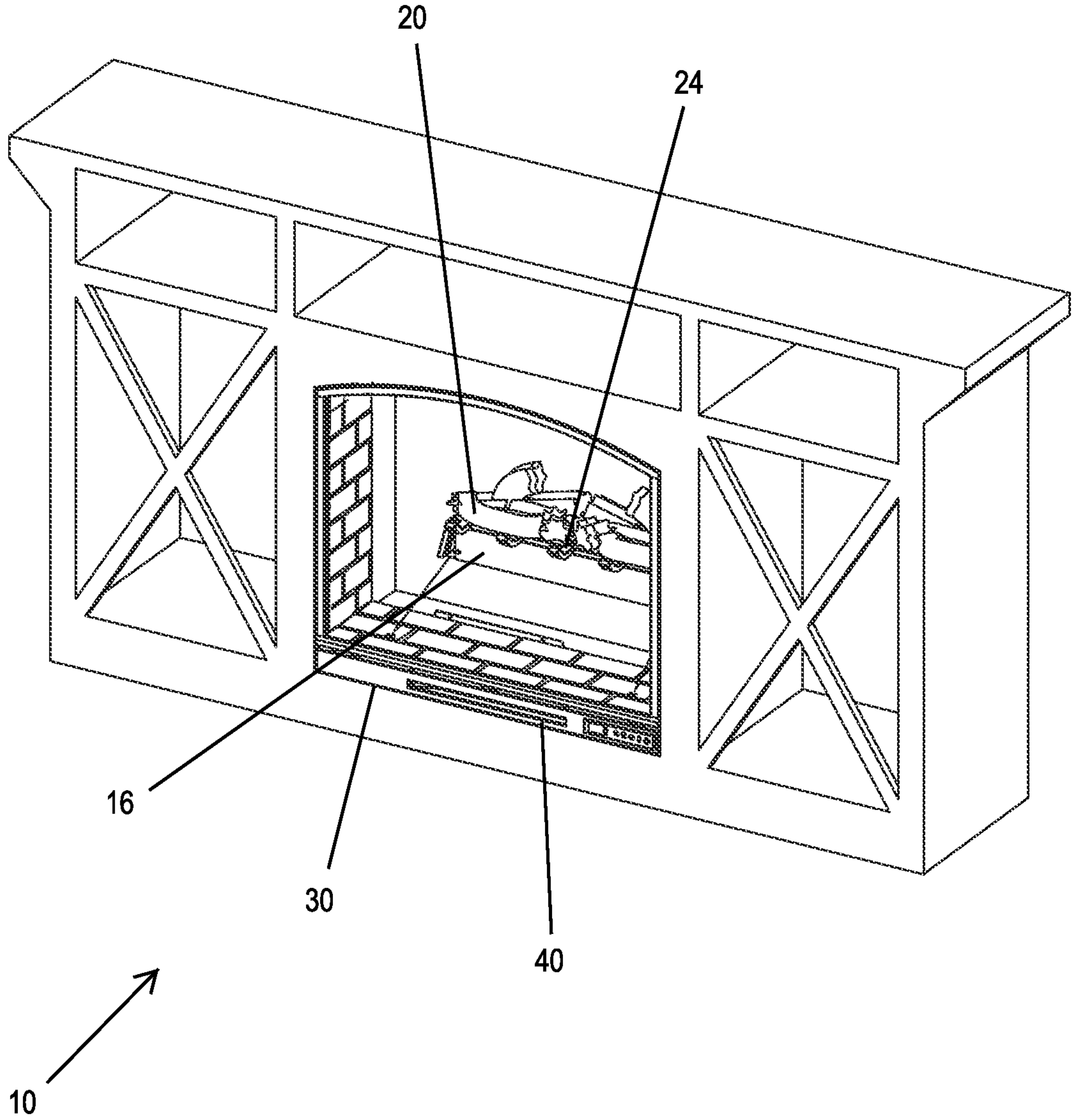
Figure 3F:
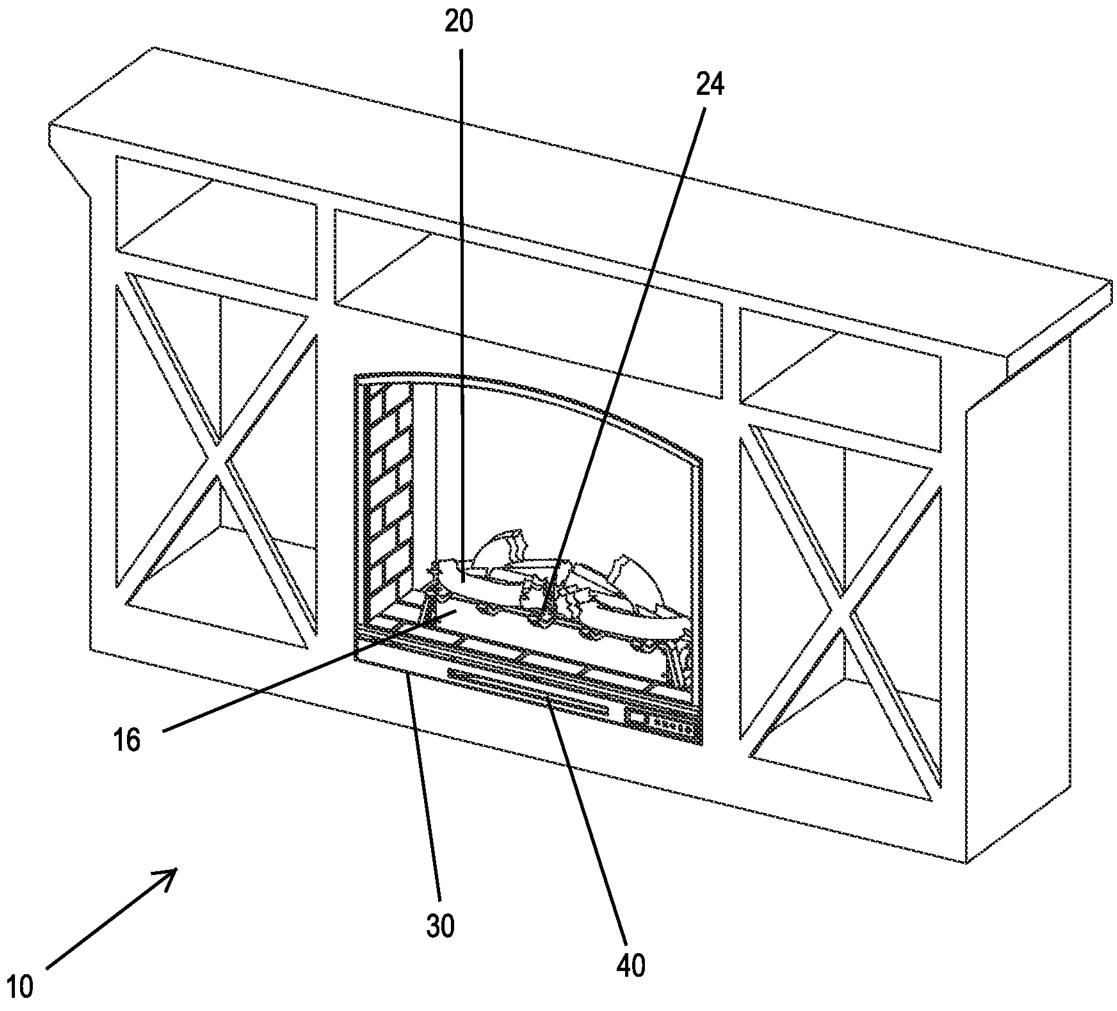
Figure 3G:
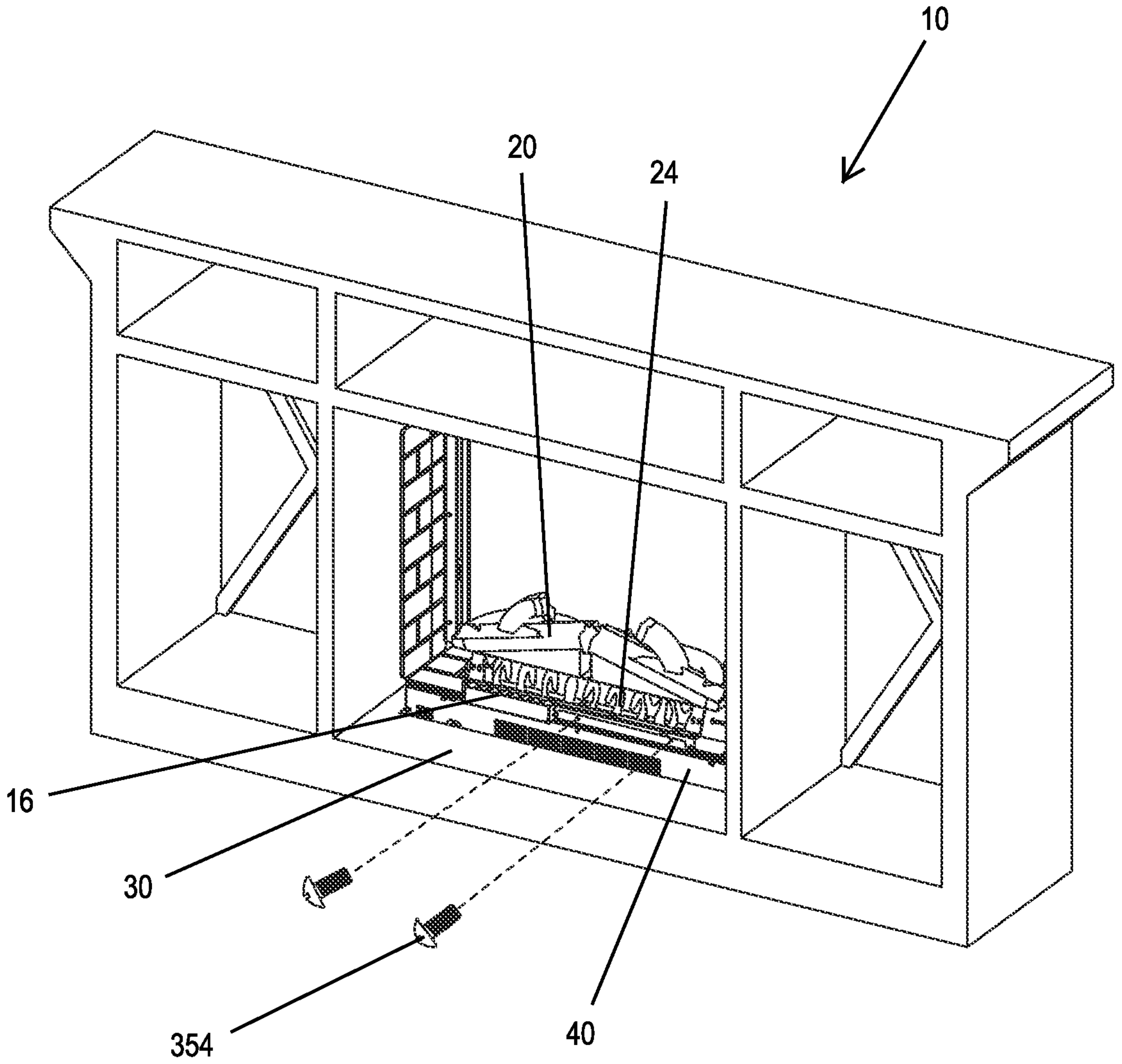
Figure 3H:
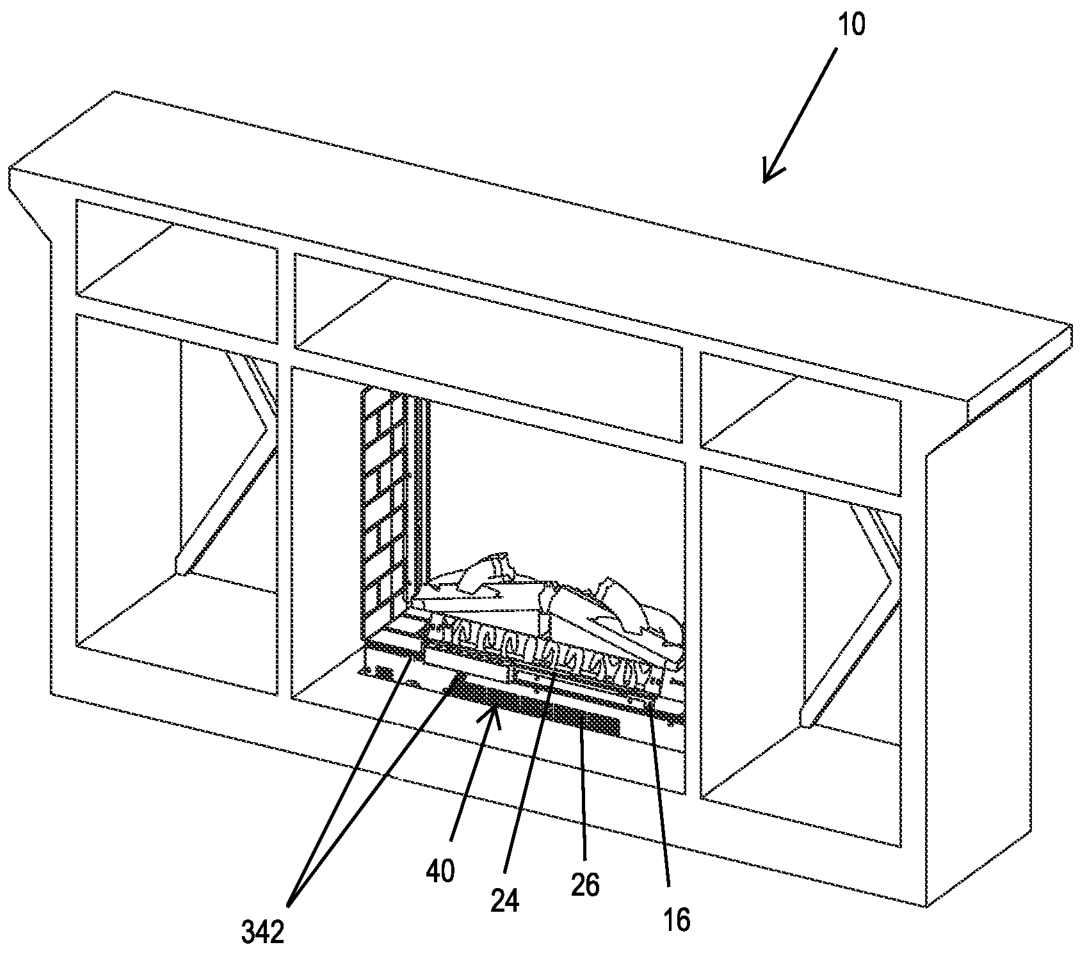

Additionally, in some embodiments, the flame generator 24 and/or the light source 22 can be powered through use of a user-friendly DC connector, or other suitable power source 342 (illustrated, for example, in FIG. 3H). In certain such embodiments, the power source 342 can include an electrical cable that extends through an opening in an insert cover 244 (illustrated in FIG. 2). Further, in some embodiments, the grate 16, with the light source 22 and/or the flame generator 24 incorporated therein, can be connected to the base module, i.e. the electrical insert 40, with a user-friendly connector, e.g., a 3.5 mm jack or other suitable connector. Further, in certain alternative embodiments, the grate 16, with the light source 22 and/or the flame generator 24 incorporated therein, can also be included as part of the base module, i.e. included with the electrical insert 40 that is mounted within base opening 230A formed into the base panel 30.

As provided herein, it is appreciated that the light source 22 and the flame generator 24 can be utilized individually or in conjunction with one another for purposes of generating the simulated flame 18 (as well as providing a glowing effect for the simulated logs 20 and/or the simulated emberbed). Accordingly, the light source 22 and the flame generator 24 can sometimes be generally referred to, individually or collectively, as a "flame generator".

The heater 26, e.g., an integrated electric heater, can be configured to provide heated air which can be directed in a generally outward direction away from the electric fireplace 10. More particularly, in certain embodiments, the heater 26 can include a blower or fan 246 (illustrated in FIG. 2) that blows hot air through heat vents 48 into the area surrounding the electric fireplace 10, e.g., a room in a house, in order to heat such area. In some embodiments, as shown in FIG. 1, the heat vents 48 can be incorporated into the electrical insert 40 and positioned near and/or adjacent to the base panel 30 of the fireplace housing 12. In such embodiments, the heat vents 48 are so positioned to allow heat to be directed generally upwardly away from the electrical insert 40. Thus, the heated air can be moved into and through the area surrounding the electric fireplace 10, e.g., a room in a house, in order to heat such area. Additionally, with such design and positioning of the heater 26 and the heat vents 48, the heat can be projected to rise up at an angle and away from the heater 26 so that it feels more like it is actually emanating from the fire itself. Alternatively, the heater 26 and/or the heat vents 48 can be positioned in a different manner, e.g., at or near an upper portion of the fireplace housing 12, or near and/or adjacent to one or both of the side panels 34 of the fireplace housing 12.

The controller 28 can include one or more circuits or processors that can be utilized to control the various functions of the electric fireplace 10. For example, the controller 28 can be utilized to activate and/or control (i) the intensity of the light source 22 and/or the flame generator 24 within the electric fireplace 10 that generates the simulated flame 18, (ii) the intensity of the light source 22 and/or the flame generator 24 within the electric fireplace 10 that creates the glowing effect for the simulated logs 20, (iii) the intensity of the light source 22 and/or the flame generator 24 within the electric fireplace 10 that creates the glowing effect for the simulated emberbed, and (iv) the speed of the blower 246 within the heater 26 to regulate the amount of heat produced and dispersed by the heater 26.

In some embodiments, the various electrical components of the electric fireplace 10, e.g., the light source 22, the flame generator 24, the heater 26 and the controller 28, can be packed separately, such as when the electric fireplace 10 and/or the fireplace housing 12 is provided in a K/D mantel configuration. Additionally, in certain embodiments, this portion of the electric fireplace 10 can also be sourced from an electrical factory. However, since these components can be formed as a relatively simple DC module, with no certifications required, these components could also potentially be sourced locally.

Additionally, in this embodiment, with all of the electrical components located embedded within, near and/or adjacent to the base panel 30, such components do not adversely inhibit the desired size and shape of the opening.

FIG. 2 is a partially exploded rear perspective view illustration of the electric fireplace 10 illustrated in FIG. 1. Additionally, FIG. 2 further illustrates the cabinet 11 including the structural opening 211A into which the electric fireplace 10 can be installed. In the condition as shown in FIG. 2, only the base panel 30 of the fireplace housing 12 has so far been installed and/or integrated within the structural opening 211A of the cabinet 11.

As illustrated, FIG. 2 shows that the electric fireplace 10 can include the fireplace housing 12 including the base panel 30 (sometimes also referred to as a "mantel base"), the back panel 32, side panels 34, and the front frame 236, the grate 16, the one or more simulated logs 20, and the electrical insert 40. As described above, at least the heater 26 and the controller 28 (illustrated in FIG. 1) are incorporated together within the electrical insert 40. Further, it is appreciated that, although not shown in FIG. 2, the electrical insert 40 can further include and/or incorporate the light source 22 (illustrated in FIG. 1) and/or the flame generator 24. Still further, since FIG. 2 is showing an exploded, and thus non-operational, view of the electric fireplace 10, the viewing area 14 (illustrated in FIG. 1), and the simulated flame 18 (illustrated in FIG. 1) are also not illustrated in FIG. 2.

As noted above, the base panel 30, the back panel 32, the side panels 34 and the front frame 236 can have any suitable design. Additionally, the design, size and shape of the base panel 30, the back panel 32, the side panels 34 and the front frame 236 can be mixed and matched as desired to provide greater flexibility to the consumer for the overall design of the electric fireplace 10. Further, in certain embodiments, one or more of the back panel 32 and the side panels 34 can be flexible and/or foldable such that they take up much less space for purposes of packaging, shipping and storage.

One objective of the construction of the electric fireplace 10, as described in detail herein, is to embed the various operational components of the electric fireplace 10 into the components of the fireplace housing 12 to make the combined packaging substantially the same size as a typical packaging of only the fireplace housing 12. For example, as illustrated in FIG. 2, the base panel 30 (or mantel base) can include the base opening 230A (or base aperture) that is configured to receive the electrical insert 40. More particularly, as shown, a lower portion of the electrical insert 40 is sized and shaped to fit and be supported and retained within the base opening 230A. Further, as illustrated, the electric fireplace 10 can also include an insert cover 244 that is configured to fit over the electrical insert 40, such that the base panel 30 and the insert cover 244 provide an outer housing for the electrical insert 40 that is positioned compactly therein.

With such design, the bulky components of the motor blower 246 of the heater 26 and the controller 28, which are integrated and/or incorporated together within the electrical insert 40, are now positioned to be embedded within the base opening 230A of the base panel 30. This allows for the viewing area 14 (illustrated in FIG. 1) to not be impeded with these bulky components as only the heat outlet, i.e. the heat vents 48 (illustrated in FIG. 1) and/or the insert cover 244, will slightly protrude over the lip of the base panel 30. Further, this also allows for the electrical insert 40 to be pre-assembled into the base panel 30, i.e. into the base opening 230A, at the factory level without impeding packaging efficiency and reducing the level of assembly required at the consumer level.

The back panel 32 and the side panels 34 can have any suitable design to create any suitable aesthetic appearance. In some embodiments, as shown in FIG. 2, the back panel 32 and/or the side panels 34 can have a brick-like appearance. Alternatively, the back panel 32 and/or the side panels 34 can have another suitable design, e.g., a magnesium oxide or stone façade, or another suitable design. Further, or in the alternative, in certain embodiments, the back panel 32 and/or the side panels 34 can be reversible to provide different options of backdrop style at the user level.

Additionally, in certain such embodiments, the back panel 32 and/or the side panels 34 can be foldable and can be mounted on a segmented substrate. In one such embodiment, as shown in FIG. 2, only the back panel 32 is mounted on a segmented substrate 232A so as to be foldable. It is appreciated that such design as shown in FIG. 2 for the back panel 32 can also be used for the side panels 34. It is further appreciated that the maintaining of the portions or segments of the segmented substrates 232A together and selectively foldable within the back panel 32 and/or the side panels 34 can be accomplished in any suitable manner. For example, in one non-exclusive embodiment, the segments are held together with a PVC lamination which can fold at the segments, but which looks like a single part when unfolded. In such embodiment, only the substrate 232A is segmented and not the PVC lamination. Alternatively, the segments of the segmented substrate 232A can be maintained together in another suitable manner. Still alternatively, the back panel 32 and/or the side panels 34 can have a different design than what is shown in FIG. 2.

With such design, despite being foldable, the back panel 32 and/or the side panels 34 can still possess the desired strength, rigidity and sturdiness to help form the fireplace housing 12 for the electric fireplace 10. Additionally, with the back panel 32 and/or the side panels 34 being foldable, it is appreciated that the back panel 32 and/or the side panels 34 can be more compact during shipping and storage.

It is further appreciated that the back panel 32 and the side panels 34 can be built locally at a mantel factory, i.e. there is no need for special construction at a specialized certified manufacturer. Additionally, the back panel 32 and/or the side panels 34 can be K/D parts that are installed as part of the fireplace housing 12 (or mantel) which enables increased depth of the fireplace housing 12 to get a larger and/or better flame projection. The noted design also allows the use of back panels 32 with thicker or heavier textures, and/or allows for multiple back panels 32 to be included within a single package.

The front frame 236 can also have any suitable size, shape and design. Further, different sizes, shapes and designs for the front frame 236 can be mixed and matched with any designs for the remainder of the electric fireplace 10 and the fireplace housing 12 as desired. For example, in one non-exclusive embodiment, the front frame 236 can be provided in the form of a single pane of glass or glass doors that are closeable so as to more fully enclose the electric fireplace 10. Additionally, or in the alternative, the front frame 236 can be provided with any suitable aesthetic decorative design aspects so as to provide a more ornate appearance. Still alternatively, the front frame 236 can have another suitable design, e.g., a simple mesh screen or any other suitable design. As such, by simply changing the design of the front frame 236, the overall aesthetic appearance of the electric fireplace 10 can be changed without actually changing a majority of the components that are individually included within the electric fireplace 10.

It is appreciated that with the design noted herein, the front frame 236 can be sourced locally and/or built by the mantel factory. In some embodiments, the front frame 236 can be independently formed and provided, and can be installed by the user. With such design, there are no height or shape restrictions for the structural opening 211A within which the electric fireplace 10 is installed, so there could be several options for oversized openings, curved openings, etc.

As noted above, the electrical insert 40 can include at least the heater 26 and the controller 28 integrally provided therein. Further, as shown, the insert cover 244 can be positioned substantially directly on top of the electrical insert 40. In some embodiments, the insert cover 244 can be utilized to enhance the overall aesthetic appearance of the electric fireplace 10. For example, in one such embodiment, the insert cover 244 can have a brick-like appearance that can be configured to match the design of the back panel 32 and the side panels 34. Alternatively, the insert cover 244 can have another suitable design provided for aesthetic purposes, or the insert cover 244 can be configured with no particular design provided thereon.

Additionally, the electrical insert 40 can further include an electrical connection 249, e.g., DC connection, for providing the necessary power to one or more of the light source 22, the flame generator 24, the heater 26 and the controller 28.

FIGS. 3A-3K are a set of illustrations showing one representative embodiment of a method of installation of the electric fireplace 10.

Initially, FIG. 3A is an illustration demonstrating installation of the electrical insert 40 into the base opening 230A of the base panel 30. More specifically, FIG. 3A illustrates a plurality of insert attachers 350 that can be utilized to effectively secure the electrical insert 40 within the base opening 230A of the base panel 30. The electric fireplace 10 can include any suitable number and design of insert attachers 350. For example, in one embodiment, as shown in FIG. 3A, the electric fireplace 10 can include four screw-type insert attachers 350 for purposes of effectively securing the electrical insert 40 within the base opening 230A of the base panel 30. Alternatively, the electric fireplace 10 can include greater than four or fewer than four insert attachers 350, and/or the insert attachers 350 can have another suitable design.

Additionally, FIG. 3A further illustrates an embodiment of the electrical insert 40, including the heater 26 and the controller 28 (with printed control board assembly (PCBA)), with the insert cover 244 positioned on top of the electrical insert 40. As noted above, the heater 26 and the controller 28 can have any suitable design. Further, as shown, the controller 28 can include a control panel 328A that enables the user to control the various functions of the electric fireplace 10, e.g., the power, the heat, the light/flames, etc.

FIG. 3B is a front perspective view illustration of the electric fireplace 10 with the electrical insert 40 having been installed and/or embedded into the base panel 30, i.e. into the base opening 230A (illustrated in FIG. 2), and the side panels 34 also having been installed within the structural opening 211A in the cabinet 11.

With the design as described herein, the configuration of the electrical insert 40 being embedded into the base panel 30 will allow for more flexibility and increased efficiencies for manufacturing hub diversification, since only the base module, i.e. the electrical insert 40 embedded into the base panel 30, would need to come from a certified insert supplier, i.e. an electrical factory.

FIG. 3C is a rear perspective view illustration of the electric fireplace 10, as the front frame 236 is being installed within the structural opening 211A of the cabinet 11. Additionally, FIG. 3A illustrates a plurality of frame attachers 352 that can be utilized to secure the front frame 236 within the structural opening 211A of the cabinet 11. The electric fireplace 10 can include any suitable number and design of frame attachers 352. For example, in one embodiment, as shown in FIG. 3C, the electric fireplace 10 can include six screw-type frame attachers 352 for purposes of effectively securing the front frame 236 within the structural opening 211A of the cabinet 11. Alternatively, the electric fireplace 10 can include greater than six or fewer than six frame attachers 352, and/or the frame attachers 352 can have another suitable design.

FIG. 3D is a front perspective view illustration of the electric fireplace 10, with the electrical insert 40 having been installed and/or embedded into the base panel 30, i.e. into the base opening 230A (illustrated in FIG. 2), and the side panels 34 and the front frame 236 also having been installed within the structural opening 211A in the cabinet 11.

FIG. 3E is a front perspective view illustration of the electric fireplace 10, with the grate 16, the simulated logs 20, the light source 22 (illustrated in FIG. 1) and the flame generator 24 in the process of being installed above the base module, i.e. the electrical insert 40 and the base panel 30.

FIG. 3F is another front perspective view illustration of the electric fireplace 10, after the grate 16, the simulated logs 20, the light source 22 (illustrated in FIG. 1) and the flame generator 24 have been installed above the base module, i.e. the electrical insert 40 and the base panel 30.

FIG. 3G is a rear perspective view illustration of the electric fireplace 10, with the grate 16, the simulated logs 20, the light source 22 (illustrated in FIG. 1) and the flame generator 24 being secured in place above the base module, i.e. the electrical insert 40 and the base panel 30, with a plurality of grate attachers 354. The electric fireplace 10 can include any suitable number and design of grate attachers 354. For example, in one embodiment, as shown in FIG. 3G, the electric fireplace 10 can include two screw-type grate attachers 354 for purposes of effectively securing the grate 16, the simulated logs 20, the light source 22 and the flame generator 24 in place above the base module. Alternatively, the electric fireplace 10 can include greater than two or fewer than two grate attachers 354, and/or the grate attachers 354 can have another suitable design.

FIG. 3H is a rear perspective view illustration of the electric fireplace 10, further illustrating a portion of the power source 342, e.g., cable connectors, that can be utilized to selectively provide power to the various electrical components of the electric fireplace 10.

Figure 3I:
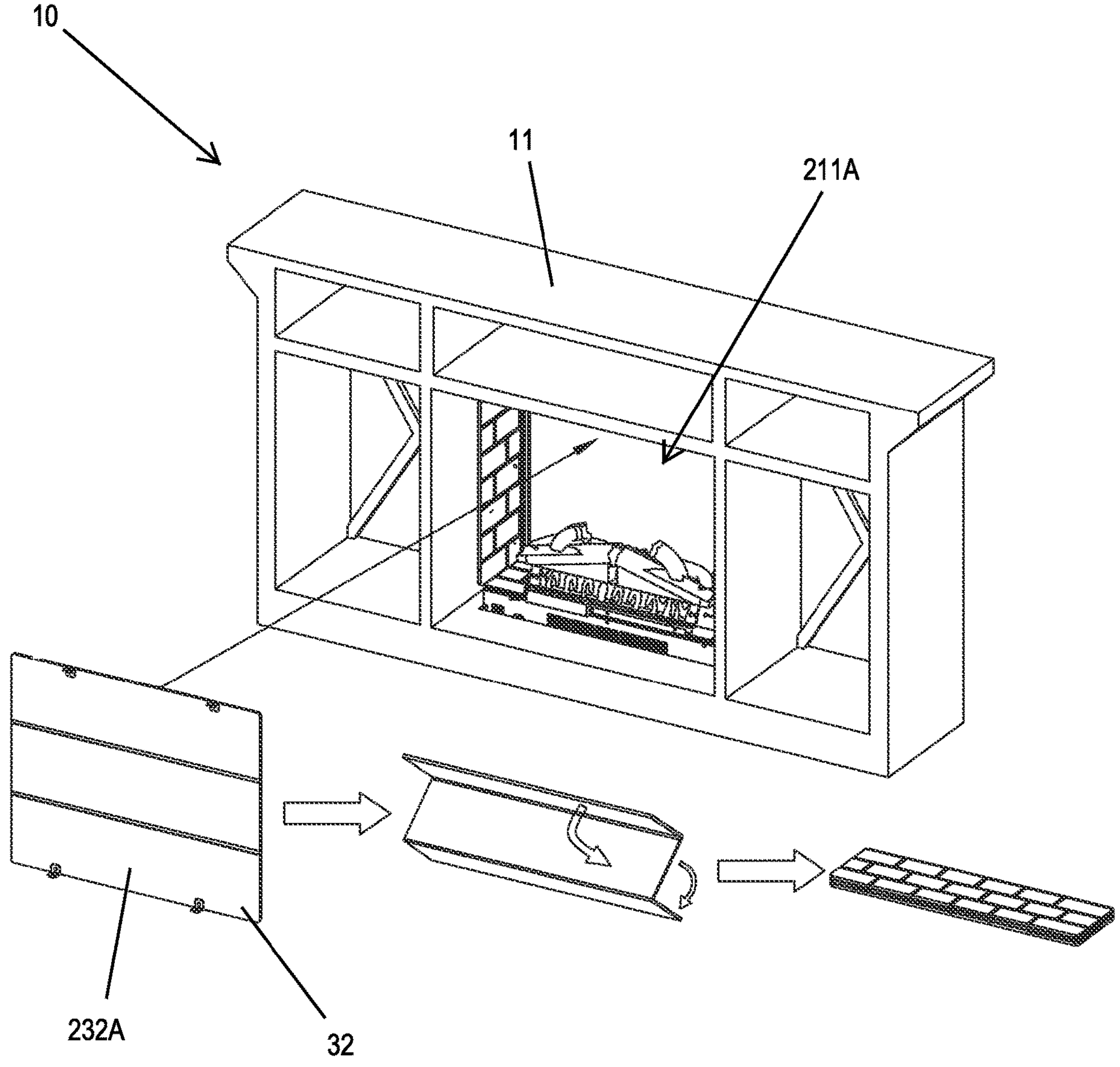

FIG. 3I is a rear perspective view illustration of the electric fireplace 10, as the back panel 32 is about to be installed within the structural opening 211A of the cabinet 11. Additionally, FIG. 3I further illustrates that in one embodiment, the back panel 30 can be mounted on a segmented substrate 232A to enable the back panel 32 to be foldable. As noted above, with such design, the back panel 32 can be packed more compactly for purposes of shipping and/or storage.

Figure 3J:
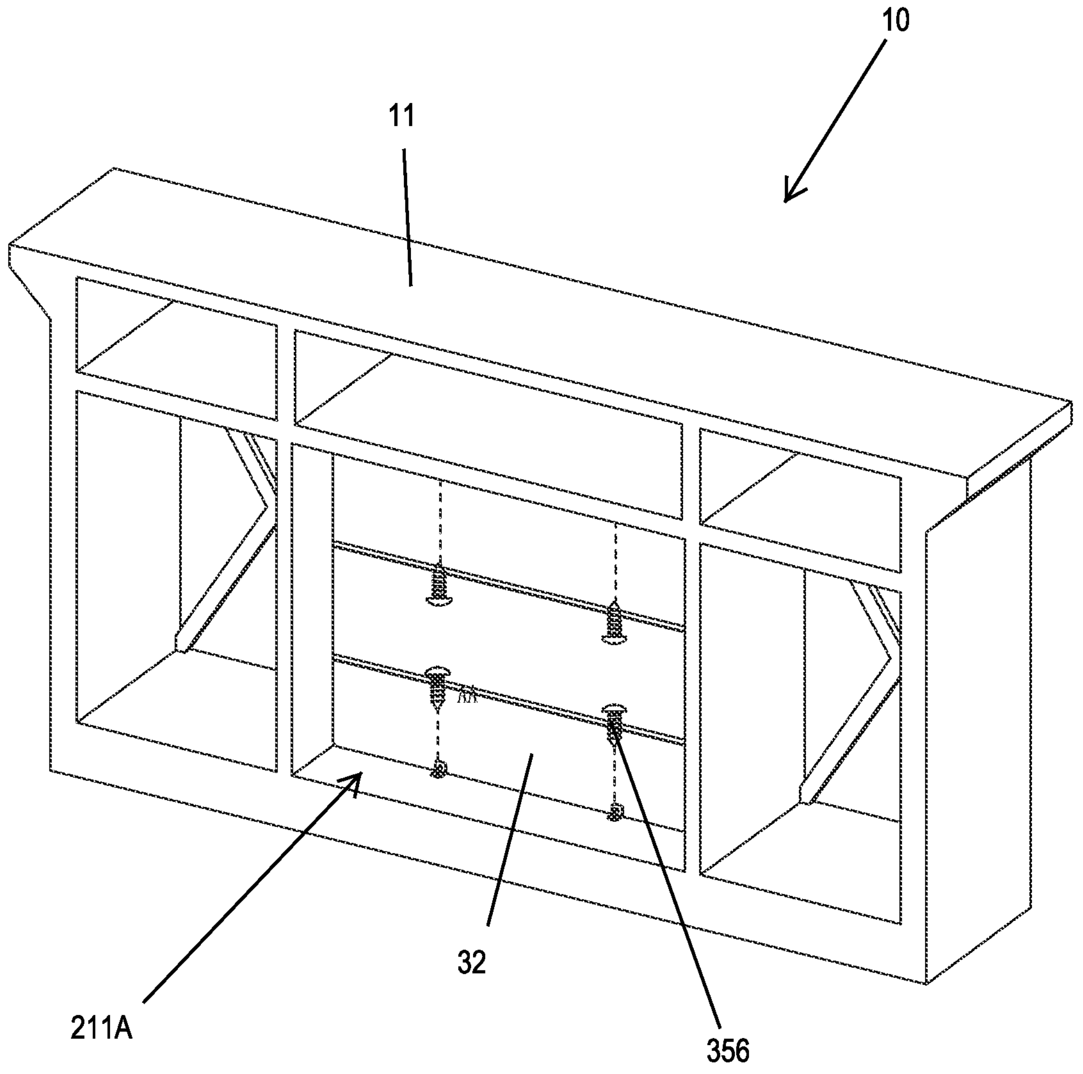

FIG. 3J is another rear perspective view illustration of the electric fireplace 10, during the process of installing the back panel 32 within the structural opening 211A of the cabinet 11. In particular, FIG. 3J illustrates a plurality of panel attachers 356 that can be utilized for installing and securing the back panel 32 within the structural opening 211A of the cabinet 11. The electric fireplace 10 can include any suitable number and design of panel attachers 356. For example, in one embodiment, as shown in FIG. 3J, the electric fireplace 10 can include four screw-type panel attachers 356 for purposes of effectively securing the back panel 32 within the structural opening 211A of the cabinet 11. Alternatively, the electric fireplace 10 can include greater than four or fewer than four panel attachers 356, and/or the panel attachers 356 can have another suitable design.

Figure 3K:
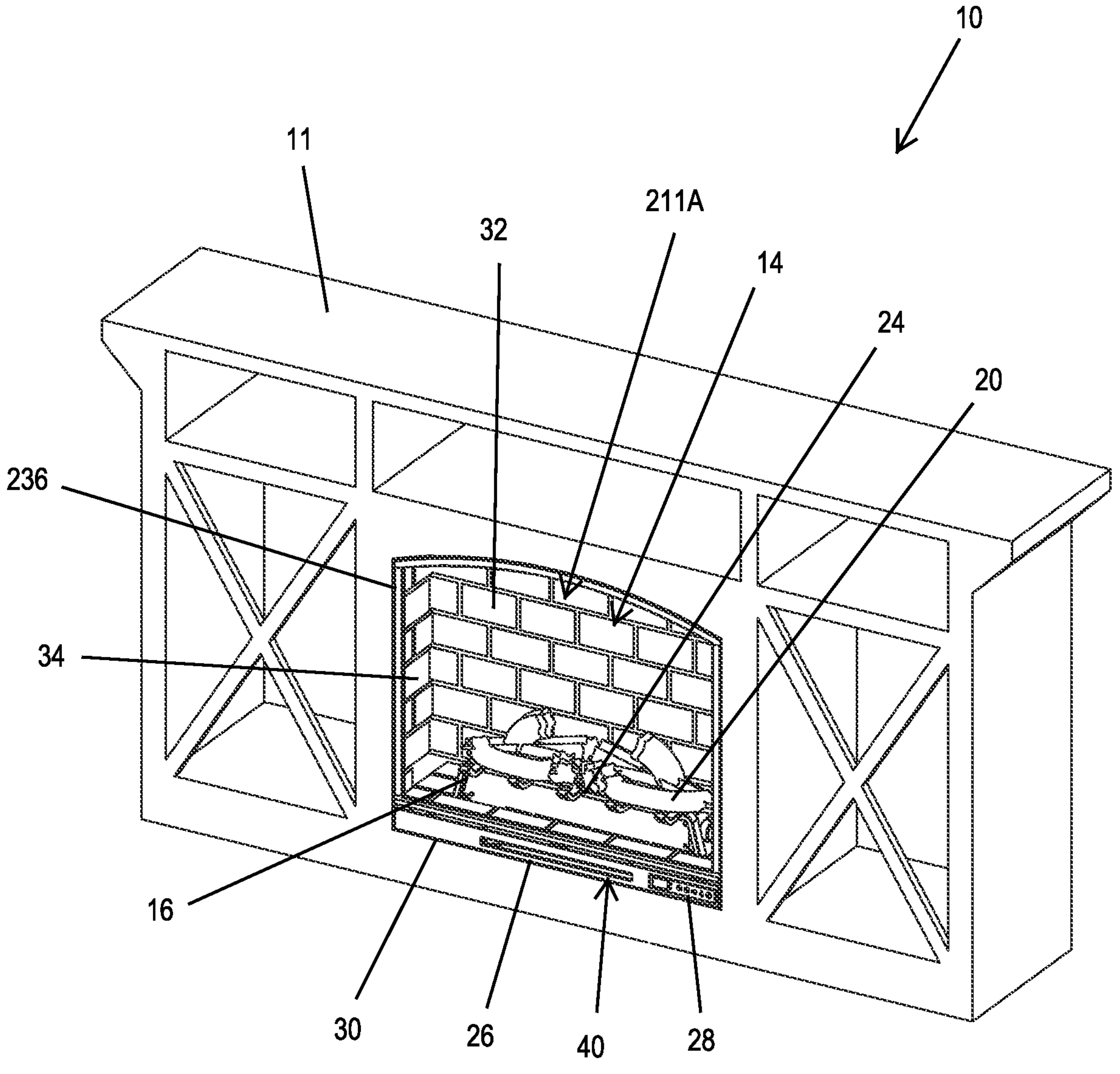

Finally, FIG. 3K is a front perspective view illustration of the electric fireplace 10, after all of the components of the electric fireplace 10 have been installed and/or secured within the structural opening 211A of the cabinet 11. More specifically, FIG. 3K illustrates the electric fireplace 10 after the base panel 30, the side panels 34, the front frame 236, the electrical insert 40, i.e. the heater 26 and the controller 28, the grate 16, the simulated logs 20, the light source 22 (illustrated in FIG. 1), the flame generator 24, and the back panel 32 have been installed and/or secured within the structural opening 211A of the cabinet 11.

Additionally, or in the alternative, it is appreciated that, in some embodiments, the electric fireplace 10 can be configured without the back panel 32 and/or the front frame 236. For example, in certain such embodiments, the electric fireplace 10 can be a two-sided fireplace, wherein the viewing area 14 is viewable from either side of the electric fireplace 10. In such embodiments, the electric fireplace 10 would be configured and/or installed without the back panel 32, and could also include a separate front frame 236 on either side.

In summary, the objective of this construction of the electric fireplace 10 is to embed the insert components into the fireplace housing 12 (or mantel) parts to make the combined packaging the same size as a typical mantel-only box size. Additionally, the construction will also improve the aesthetic appearance of the overall electric fireplace 10 as there are no longer height or shape restrictions for the mantel opening. Further, the appearance of the simulated flame 18 will be improved due to increased depth and more backdrop options. Moreover, backdrop depth is no longer limited by insert enclosure size, so heavier textures can be used with larger flame projection. Different backdrop styles and/or reversible backdrops can also be provided for different options at the user level.

Additionally, since there are no limitations on the height of the structural opening 211A, e.g., within the cabinet 11, or the size and shape of the back panel 32 and/or the simulated logs 20, more standardized structural features can be utilized. For example, a standardized 26-inch part can be utilized within 23-inch, 26-inch or 28-inch structural openings; and a standardized 36-inch part can be utilized within 33-inch and 36-inch structural openings. Different heights, shapes and simulated logs can then be utilized to differentiate the overall design.

Figure 4A:
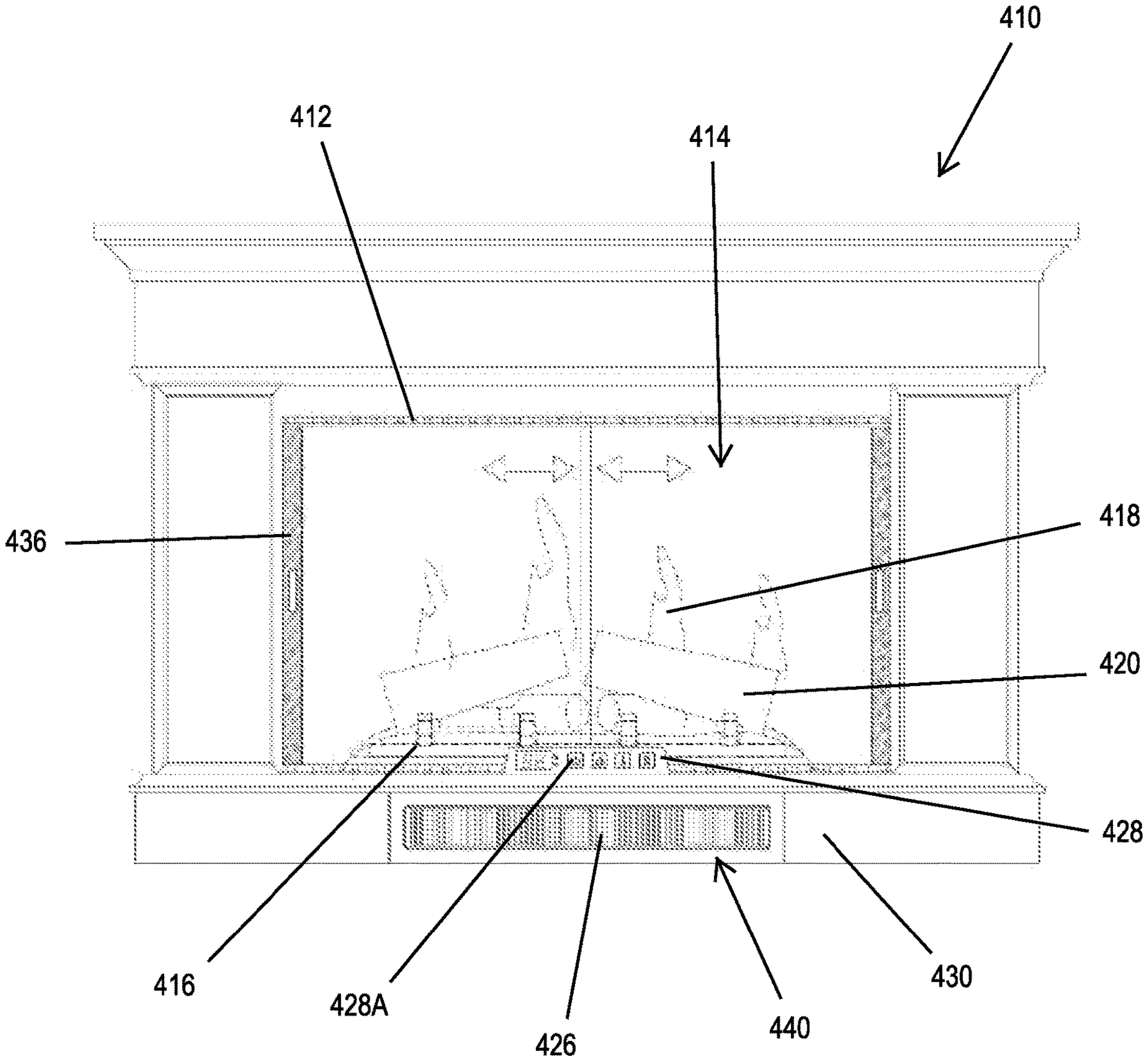
FIG. 4A is a simplified front view illustration of another embodiment of the electric fireplace.

FIG. 4A is a simplified front view illustration of another embodiment of the electric fireplace 410. As illustrated, the electric fireplace 410 is somewhat similar in design to those embodiments illustrated and described herein above. For example, in this embodiment, the electric fireplace 410 again includes a fireplace housing 412, a viewing area 414, a grate 416, a simulated flame 418, simulated logs 420, and a light source 422 (illustrated in FIG. 4B) and/or a flame generator 424 (illustrated more clearly in FIG. 4B) that are substantially similar to what was illustrated and described herein above. Additionally, the electric fireplace 410 further includes an electrical insert 440 that includes a heater 426, and at least portion of a controller 428, that are somewhat similar to what was illustrated and described in previous embodiments.

Figure 4B:
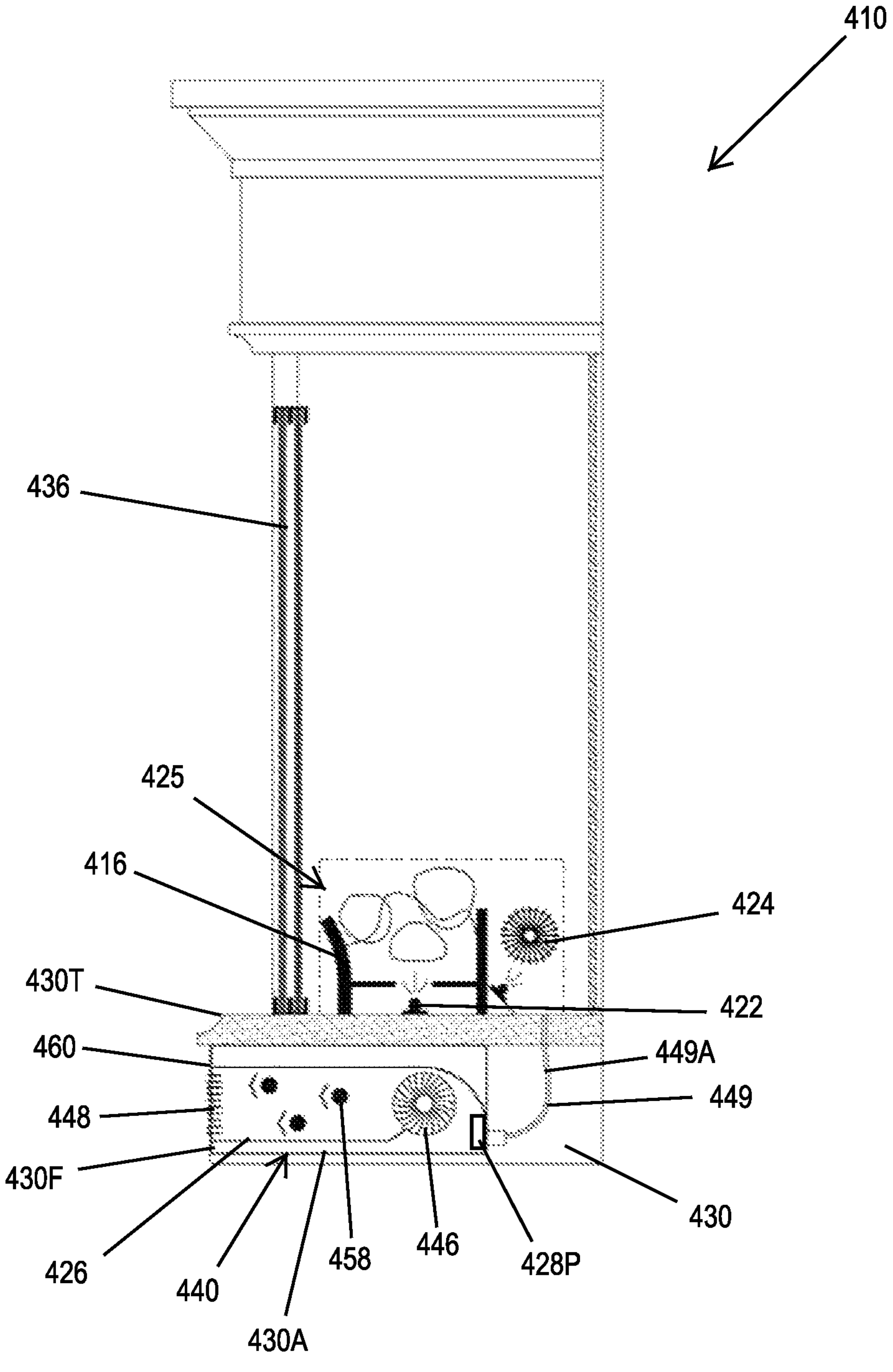
FIG. 4B is a cross-sectional side view illustration of the electric fireplace illustrated in FIG. 4A taken on line B-B.

However, in this embodiment, the base panel 430 of the fireplace housing 412 is somewhat different than in the previous embodiments. Referring briefly to FIG. 4B, FIG. 4B is a cross-sectional side view illustration of the electric fireplace 410 illustrated in FIG. 4A taken on line B-B. In this embodiment, as shown in FIG. 4B, the electrical insert 440 is positioned to be more fully embedded within the base opening 430A of the base panel 430, i.e. such that no part of the electrical insert 440 extends and/or protrudes above a top surface 430T of the base panel 430. With such design, the electric fireplace 410 can have any even more compact overall design during use, as well as for purposes of packaging, shipping and storage.

Additionally, as such, the heater 426 also has a somewhat modified design in comparison to the embodiments described in detail herein above. As with the previous embodiments, the heater 426 is configured to provide heated air which can be directed in a generally outward direction away from the electric fireplace 410. More particularly, as shown in FIG. 4B, the heater 426 includes a blower or fan 446 that blows hot air generated by one or more heating elements 458 through heat vents 448 into the area surrounding the electric fireplace 410. In this embodiment, the heat vents 448 are positioned to extend and/or direct the heated air through a front opening 460 in the base panel 430. Stated in another manner, the heated air is directed away from a front surface 430F of the base panel 430, i.e. through the heat vents 448, rather than the top surface 430T of the base panel 430 as in previous embodiments.

Moreover, in this embodiment, the controller 428 includes components that are included within the electrical insert 440 as well as components that can be alternatively coupled to the grate 416. For example, in one non-exclusive embodiment, the controller 428 can include a main PCBA 428P that is coupled to and/or integrated within the electrical insert 440, and a control panel 428A (illustrated in FIG. 4A) that is coupled to the grate 416 instead of being directly coupled to the body of the electrical insert 440, as was shown in the previous embodiments. With such design, the control panel 428A will be easily accessible to the user, as the user will merely have to open the front frame 436, e.g., by sliding doors of the front frame 436 relative to one another. Alternatively, the control panel 428A can be coupled to and/or incorporated as part of the electrical insert 440, and a separate front opening (not shown) in the base panel 430 can be utilized to provide access to the control panel 428A by the user.

FIG. 4B further illustrates an electrical connection 449 that is electrically coupled between the main PCBA 428P and the grate 416, and thus the electrical components coupled thereto and/or incorporated therein. Thus, the electrical connection 449 can be used for providing the necessary power and control between the electrical insert 440 and the grate 416 to effectively power one or more of the light source 422, the flame generator 424, the heater 426 and the controller 428.

It is understood that although a number of different embodiments of the electric fireplace 10 have been illustrated and described herein, one or more features of any one embodiment can be combined with one or more features of one or more of the other embodiments, provided that such combination satisfies the intent of the present invention.

While a number of exemplary aspects and embodiments of the electric fireplace 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for installing an electric fireplace by a user into a structural opening of a cabinet, the method comprising the steps of:

providing a modular electric fireplace to the user, the modular electric fireplace having a plurality of independent components including (i) a fireplace housing having at least one of a back panel, a base panel, and a side panel, (ii) an electric heater that is configured to provide heated air, and (iii) an electric, flame generator that is configured to generate a simulated flame;

installing and individually attaching the at least one of a back panel, a base panel, and a side panel of the fireplace housing to the cabinet with a panel attacher independently of the heater and the flame generator so that the at least one of a base panel, a back panel, and a side panel is positioned within and secured to the structural opening of the cabinet independently of at least one of the heater and the flame generator; and installing into the structural opening and coupling the heater and the flame generator to the cabinet independently of the at least one of a base panel, a back panel, and a side panel of the fireplace housing so that the heater and the flame generator are positioned within the structural opening of the cabinet.

2. The method of claim 1 wherein the step of providing includes the fireplace housing having at least two of a back panel, a base panel, and a side panel; and wherein the step of attaching the at least one of a back panel, a base panel, and a side panel includes attaching the at least two of a back panel, a base panel, and a side panel of the fireplace housing to the cabinet independently of the heater and the flame generator, and independently of one another so that the at least two of a base panel, a back panel, and a side panel are positioned within and secured to the structural opening of the cabinet independently of the at least one of the heater and the flame generator.

3. The method of claim 1 wherein the step of providing includes the fireplace housing having each of a back panel, a base panel, and a side panel; and wherein the step of attaching the at least one of a back panel, a base panel, and a side panel includes attaching each of the back panel, the base panel, and the side panel of the fireplace housing to the cabinet independently of the heater and the flame generator, and independently of one another so that each of the base panel, the back panel, and the side panel are positioned within and secured to the structural opening of the cabinet independently of the at least one of the heater and the flame generator.

4. The method of claim 1 further comprising the step of electrically connecting the flame generator to the heater with a connector cable that is electrically coupled at one end to the flame generator and electrically coupled at the other end to the heater.

5. The method of claim 4 wherein the step of electrically connecting includes the connector cable including a DC connector cable.

6. The method of claim 4 wherein the step of electrically connecting includes electrically connecting the flame generator to the heater with the connector cable after the flame generator and the heater have been positioned within the structural opening of the cabinet.

7. The method of claim 4 wherein the step of providing includes the plurality of components further including at least one simulated log and a grate configured to support the at least one simulated log; and the method further comprising the step of attaching the grate to the cabinet independently of the heater so that the grate is positioned within the structural opening of the cabinet.

8. The method of claim 1 wherein the step of providing includes the fireplace housing further having a front frame; and the method further comprising the step of attaching the front frame to the cabinet independently of the at least one of a base panel, a back panel, and a side panel of the fireplace housing, and independently of the heater and the flame generator.

9. A modular electric fireplace that is configured to be installed by a user into a structural opening of a cabinet, the modular electric fireplace comprising:

- a fireplace housing having at least one of a back panel, a base panel, and a side panel;
- an electric heater that is configured to generate heated air; and
- an electric, flame generator that is configured to generate a simulated flame;
- wherein the at least one of a back panel, a base panel, and a side panel of the fireplace housing is installed and individually attached to the cabinet with a panel attacher independently of the heater and the flame generator so that the at least one of a base panel, a back panel, and a side panel is positioned within and secured to the structural opening of the cabinet independently of at least one of the heater and the flame generator; and
- wherein the heater and the flame generator are installed into the structural opening and coupled to the cabinet independently of the at least one of a base panel, a back panel, and a side panel of the fireplace housing so that the heater and the flame generator are positioned within the structural opening of the cabinet.

10. The modular electric fireplace of claim 9 wherein the fireplace housing has at least two of a back panel, a base panel, and a side panel; and wherein the at least two of a back panel, a base panel, and a side panel of the fireplace housing are attached to the cabinet independently of the heater and the flame generator, and independently of one another so that the at least two of a base panel, a back panel, and a side panel are positioned within and secured to the structural opening of the cabinet independently of the at least one of the heater and the flame generator.

11. The modular electric fireplace of claim 9 wherein the fireplace housing has each of a back panel, a base panel, and a side panel; and wherein each of the back panel, the base panel, and the side panel of the fireplace housing are attached to the cabinet independently of the heater and the flame generator, and independently of one another so that each of the base panel, the back panel, and the side panel are positioned within and secured to the structural opening of the cabinet independently of the at least one of the heater and the flame generator.

12. The modular electric fireplace of claim 9 further comprising a connector cable for electrically connecting the flame generator to the heater, the connector cable being configured to be electrically coupled at one end to the flame generator, and electrically coupled at the other end to the heater.

13. The modular electric fireplace of claim 12 wherein the connector cable includes a DC connector cable.

14. The modular electric fireplace of claim 12 wherein the connector cable electrically connects the flame generator to the heater after the flame generator and the heater have been positioned within the structural opening of the cabinet.

15. The modular electric fireplace of claim 12 further comprising at least one simulated log and a grate configured to support the at least one simulated log, the grate being attached to the cabinet independently of the heater so that the grate is positioned within the structural opening of the cabinet.

16. The modular electric fireplace of claim 9 wherein the fireplace housing further has a front frame that is attached to the cabinet independently of the at least one of a base panel, a back panel, and a side panel of the fireplace housing, and independently of the heater and the flame generator.

17. A method for installing an electric fireplace by a user into a structural opening of a cabinet, the method comprising the steps of:

- providing a modular electric fireplace to the user, the modular electric fireplace having a plurality of independent components including (i) a fireplace housing having at least one of a back panel, a base panel, and a side panel; (ii) an electric heater that is configured to provide heated air; (iii) an electric, flame generator that is configured to generate a simulated flame; and (iv) at least one simulated log and a grate configured to support the at least one simulated log; wherein the flame generator is incorporated into the grate;
- attaching the at least one of a back panel, a base panel, and a side panel of the fireplace housing to the cabinet independently of the heater and the flame generator so that the at least one of a base panel, a back panel, and a side panel is positioned within and secured to the structural opening of the cabinet independently of at least one of the heater and the flame generator;
- attaching the heater and the flame generator to the cabinet independently of the at least one of a base panel, a back panel, and a side panel of the fireplace housing so that the heater and the flame generator are positioned within the structural opening of the cabinet;

attaching the grate to the cabinet independently of the heater so that the grate is positioned within the structural opening of the cabinet; and electrically connecting the flame generator to the heater with a connector cable that is electrically coupled at one end to the flame generator and electrically coupled at the other end to the heater; wherein the connector cable is coupled to the grate.

18. A modular electric fireplace that is configured to be installed by a user into a structural opening of a cabinet, the modular electric fireplace comprising:

a fireplace housing having at least one of a back panel, a base panel, and a side panel;

an electric heater that is configured to generate heated air; and an electric, flame generator that is configured to generate a simulated flame;

a connector cable for electrically connecting the flame generator to the heater, the connector cable being configured to be electrically coupled at one end to the flame generator, and electrically coupled at the other end to the heater;

at least one simulated log and a grate configured to support the at least one simulated log, wherein the flame generator is incorporated into the grate; wherein the connector cable is coupled to the grate;

wherein the at least one of a back panel, a base panel, and a side panel of the fireplace housing is attached to the cabinet independently of the heater and the flame generator so that the at least one of a base panel, a back panel, and a side panel is positioned within and secured to the structural opening of the cabinet independently of at least one of the heater and the flame generator;

wherein the heater and the flame generator are attached to the cabinet independently of the at least one of a base panel, a back panel, and a side panel of the fireplace housing so that the heater and the flame generator are positioned within the structural opening of the cabinet; and wherein the grate is attached to the cabinet independently of the heater.

19. A method for installing an electric fireplace by a user into a structural opening of a cabinet, the method comprising the steps of:

providing a modular electric fireplace to the user, the modular electric fireplace having a plurality of components including (i) an electric heater that is configured to provide heated air, (ii) an electric, flame generator that is configured to generate a simulated flame, (iii) at least one simulated log, and (iv) a grate configured to support the at least one simulated log;

installing the electric heater into the cabinet;

installing the electric, flame generator, the grate, and the at least one simulated log into the cabinet above the electric heater, after the electric heater has been installed into the cabinet; and electrically connecting the electric, flame generator to the electric heater.

20. The method of claim 19 wherein the step of electrically connecting includes electrically connecting the flame generator to the heater with a connector cable that is electrically coupled at one end to the flame generator and electrically coupled at the other end to the heater, wherein electrically connecting occurs after the electric flame generator is positioned above the electric heater.

* * * * *